US009143198B2

United States Patent
Reuven

(10) Patent No.: US 9,143,198 B2
(45) Date of Patent: Sep. 22, 2015

(54) POWER LINE COMMUNICATION METHOD AND APPARATUS

(71) Applicant: SIGMA DESIGNS ISRAEL S.D.I. LTD., Tel-Aviv (IL)

(72) Inventor: Ilan Reuven, Ganey Tikva (IL)

(73) Assignee: SIGMA DESIGNS ISRAEL S.D.I. LTD., Tel-Aviv (IL)

( * ) Notice: Subject to any disclaimer, the term of this patent is extended or adjusted under 35 U.S.C. 154(b) by 94 days.

(21) Appl. No.: 14/142,508

(22) Filed: Dec. 27, 2013

(65) Prior Publication Data

US 2014/0112400 A1 Apr. 24, 2014

Related U.S. Application Data

(63) Continuation-in-part of application No. 13/340,344, filed on Dec. 29, 2011, now Pat. No. 8,952,567, which is a continuation of application No. PCT/IL2010/000522, filed on Jun. 29, 2010.

(60) Provisional application No. 61/357,866, filed on Jun. 23, 2010, provisional application No. 61/221,125, filed on Jun. 29, 2009.

(51) Int. Cl.
*H04B 3/54* (2006.01)
*H04B 3/56* (2006.01)

(52) U.S. Cl.
CPC .. *H04B 3/56* (2013.01); *H04B 3/54* (2013.01); *H04B 2203/5416* (2013.01); *H04B 2203/5445* (2013.01); *H04B 2203/5466* (2013.01); *H04B 2203/5483* (2013.01)

(58) Field of Classification Search
None
See application file for complete search history.

(56) References Cited

U.S. PATENT DOCUMENTS

| 5,066,939 | A | 11/1991 | Mansfield, Jr. |
| 2008/0057866 | A1 | 3/2008 | Schwager et al. |

(Continued)

FOREIGN PATENT DOCUMENTS

| EP | 1 892 843 | 2/2008 |
| EP | 2 019 496 | 1/2009 |
| EP | 2 028 769 | 2/2009 |

OTHER PUBLICATIONS

Giovaneli et al. "Space-Frequency Coded OFDM System for Multiple-Wire Power Line Communications." *IEEE*. 2005. pp. 191-195.
Stadelmeier et al. "MIMO Inhome Power Line Communications.".

*Primary Examiner* — Jared Fureman
*Assistant Examiner* — Joel Barnett
(74) *Attorney, Agent, or Firm* — Merchant & Gould P.C.

(57) ABSTRACT

A system for transmitting and receiving signals over residential electrical cables includes at least one active wire, neutral wire and ground wire, including at least two power line modems, each coupling an electrical device with an electrical socket, each one of the power line modems including a processor. The system has transmitters and at least one receiver, the transmitters and the receiver including a coupling circuit, the coupling circuit including a first transformer and a second transformer, the first transformer including a center tap. Receive and transmit wire pairs are respectively formed from two of the active, neutral and ground wires and the midpoint, the transmitters defining a carrier wave set over the transmit wire pair. The processor determines a frequency carrier wave for the signals and provides the signals to a respective one of the transmitters according to the carrier wave set the frequency carrier wave is in.

3 Claims, 12 Drawing Sheets

(56) References Cited

U.S. PATENT DOCUMENTS

| | | | |
|---|---|---|---|
| 2008/0273613 A1* | 11/2008 | Kol | 375/260 |
| 2009/0060060 A1 | 3/2009 | Stadelmeier et al. | |
| 2010/0081467 A1 | 4/2010 | Alex et al. | |
| 2014/0269952 A1* | 9/2014 | Katar et al. | 375/258 |

* cited by examiner

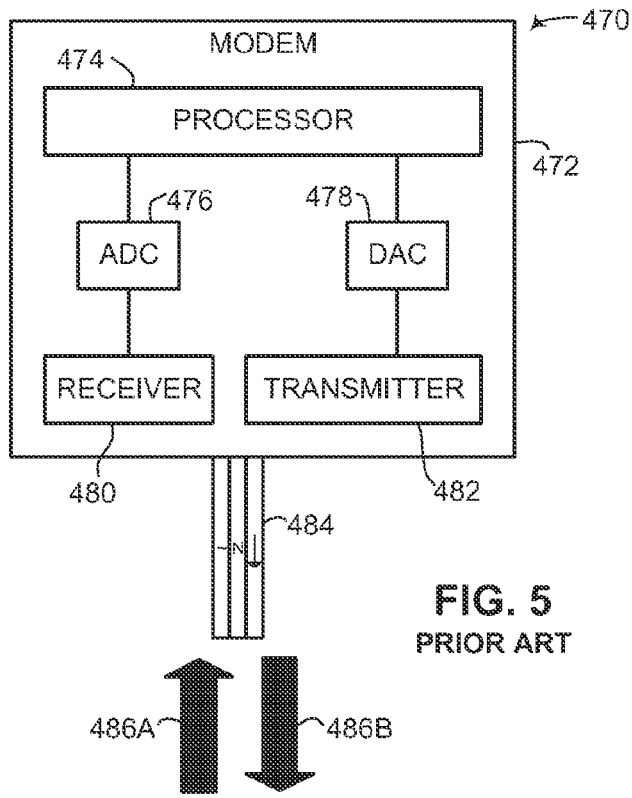
FIG. 5
PRIOR ART
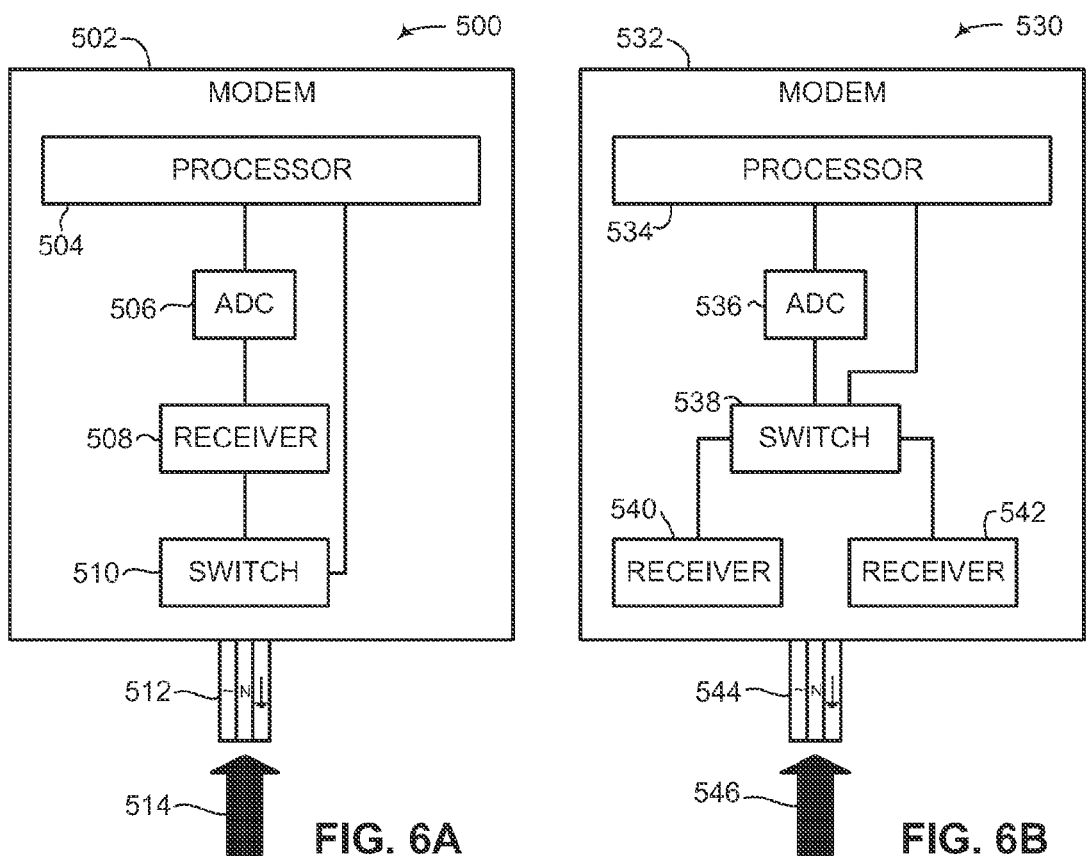
FIG. 6A
FIG. 6B

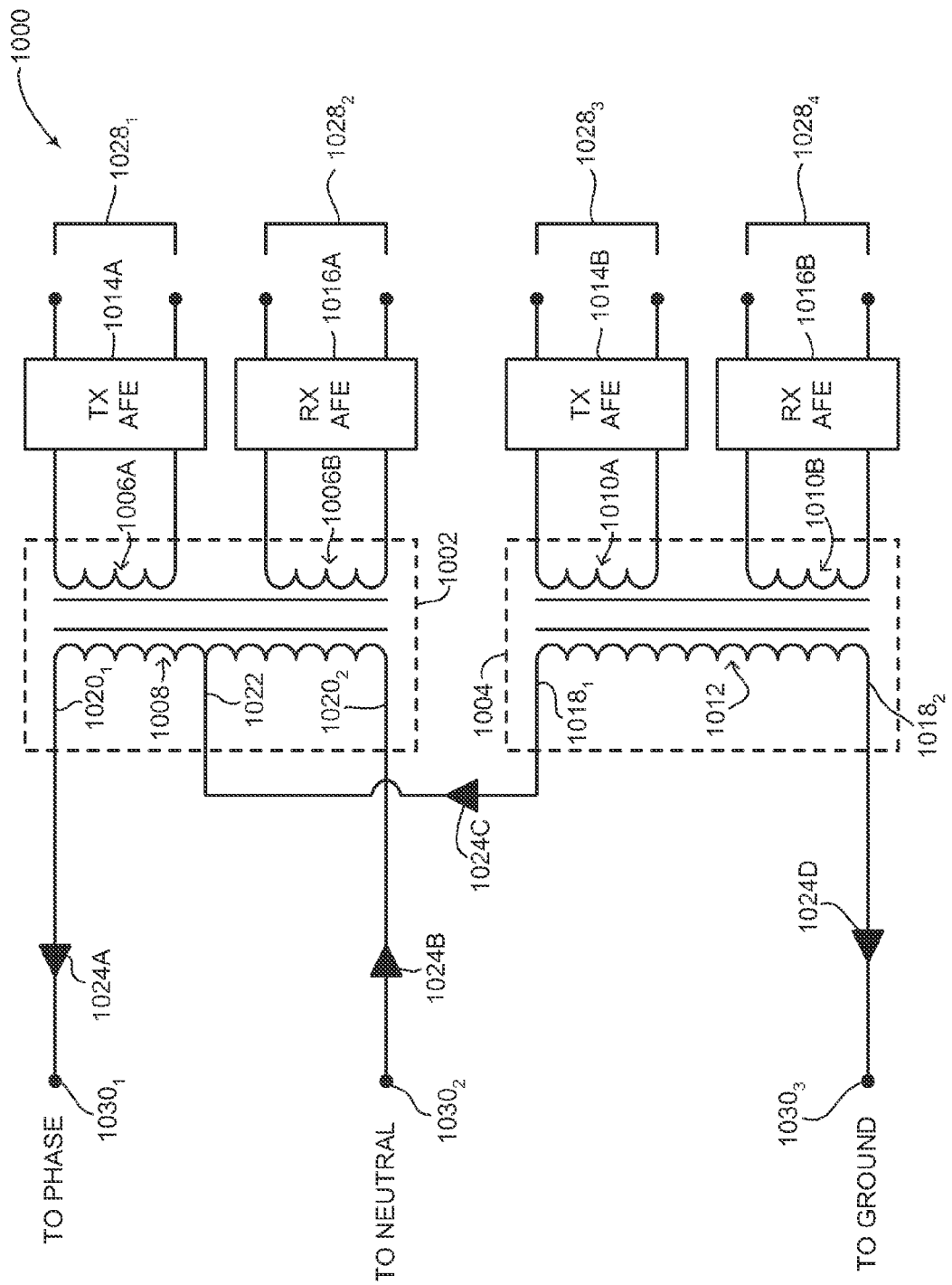

POWER LINE COMMUNICATION METHOD AND APPARATUS

This application is a Continuation-in-Part of U.S. Ser. No. 13/340,344, filed 29 Dec. 2011 which is a Continuation of PCT/IL2010/000522, filed 29 Jun. 2010, which claims benefit of U.S. Provisional Ser. No. 61/357,866, filed 23 Jun. 2010 and U.S. Provisional Ser. No. 61/221,125, filed 29 Jun. 2009 and which applications are incorporated herein by reference. To the extent appropriate, a claim of priority is made to each of the above disclosed applications.

FIELD OF THE INVENTION

The disclosed technique relates to power line communication, in general, and to methods and systems for enabling power line communication signals to be switched between power line pairs, in particular.

BACKGROUND OF THE INVENTION

Power line communication (herein abbreviated PLC) refers to methods and systems for enabling data to be transferred over electrical cables. PLC is also referred to in the art as power line digital subscriber line, power line carrier, mains communication, power line telecom and power line networking. In the case that PLC is used to provide access to the Internet, or for video distribution over a network, the methods and systems are referred to as broadband over power lines (herein abbreviated BPL). Electrical cables can also be referred to as power cables, power lines, electrical power lines, electrical wiring, electrical cabling and the like. These terms are used interchangeably herein and represent the cabling used to transfer electricity from an electricity provider, such as an electric company (e.g. Pacific Gas & Electric, Florida Power & Light, etc. . . . ) or an electricity generator (e.g., a wind energy converter), to a residence, as well as the wires used in a residence to transfer electricity to various wall sockets, electrical outlets, wall plugs and power points in the residence. PLC enables various devices, such as computers, printers, televisions and other electrical devices in a residence, to be coupled with one another, as a network, without the need for new wires to be added to the residence. A residence can refer to a private home, an apartment building, an office building or other structures where people live that receive electricity. Each device to be coupled in the network requires a separate element for enabling it to transfer data over the electrical wiring. Such an element is usually referred to as a modem, and commonly referred to in the art as a power line modem. Such modems usually transfer data in the high frequency range, which is usually on the order of megahertz or higher. PLC methods are known in the art.

US Patent Application Publication No. 2008/0057866 A1, issued to Schwager et al., entitled "Method for transmitting a signal on a power line network, transmitting unit, receiving unit and system" is directed to a system and method for transmitting a signal on a PLC network. The PLC system includes first and second diversity PLC-modems connected to a power line network, e.g. a building network. The PLC-modems use the power-line network to transmit and receive data. The power-line network includes three lines: phase (P), neutral (N) and protective earth (PE). The PLC-modems are connected to and utilize all three lines by transmitting data on pairs of the lines: P-N, N-PE or P-PE. The receiving PLC-modem includes a transmitting unit T and a receiving unit R, which is adapted to receive DM (i.e., differential mode) signals from any combination of lines. The transmission unit T includes a signal generator, a transmitter and a transmitter connector. The receiver unit R includes a receiver connector, a receiver and a combiner. The signal generator of the transmitting unit T is coupled to the transmitter. The transmitter connector connects the transmitter to all of the three network lines (P, N, PE). The receiver connector of the receiving unit R connects the receiver to all of the three network lines. The receiver is coupled to the combiner. A receiving connector may be adapted to act as a transmitting connector and vice-versa when transmitting or receiving signals in the other direction. The signal generator of the transmitting unit T receives a signal from which at least two auxiliary signals are generated. The auxiliary signals are transmitted through at least two transmission channels. The receiver of the receiving unit R receives the two auxiliary signals. The two received auxiliary signals are transmitted to the combiner, which combines the signals in order to obtain the original signal. A transmission channel may use two out of the three pairs of lines for signal feeding and all three combinations of pairs for receiving. Measurements show that different transmission channels obtain different fading characteristics for different frequency bands. Channel characteristics are evaluated by the transmitting unit T and receiving unit R of the intended transmitting and receiving PLC-modems prior to or during the transmission of the at least two auxiliary signals. According to the aforementioned evaluation, the transmission unit T determines which feeding channels are best suited for the specific transmission frequency band, which is intended to be used or in use. Evaluation of channel characteristics should be measured over time, since it may change in time. Advanced diversity techniques may be used, such as MIMO (i.e., Multiple-In Multiple-Out), thereby allowing transmission of different signals over the individual transmission links. If so, channel evaluation is performed for each individual link. Transmission channels may differ in, but are not limited to, the frequency domain, phase domain, time domain or spatial domain. Common mode signals may be detected in addition.

US Patent Application Publication No. 2009/0060060 A1, issued to Stadelmeier et al., entitled "Method for transmitting a signal from a transmitter to a receiver in a power line communication network, transmitter, receiver, power line communication modem and power line communication system" is directed to a system and method for transmitting signals in PLC networks. The PLC system includes first and second PLC modems in a MIMO mode. Each PLC modem may be used as both transmitter and receiver, thereby forming a bidirectional communication network. The PLC modems are connected to a home installation. The home installation includes three wires: phase line (P), neutral line (N) and protective earth (PE). Feeding signals are performed between a pair of the wires, hence allowing three possible transmission paths: P-N, N-PE and P-PE. The PLC modem, which is in a transmission mode, uses two transmission paths, and the PLC modem, which is in a receiving mode, uses all three possible transmission paths. In addition, a common mode (CM) path may be used. The transmitting PLC modem transmits an initial data burst, which includes a training sequence, to the receiving PLC modem. The receiving PLC modem evaluates the MIMO channels and calculates encoding and decoding matrices from the evaluated MIMO channels' eigenvalues and an adaptive OFDM tonemap. A feedback data is transmitted back to the transmitting PLC modem. The receiving PLC modem selects the adaptive OFDM tonemap for decoding and a corresponding decoding eigenbeamforming matrix. The transmitting PLC modem selects the adaptive OFDM and the encoding eigenbeamforming matrix according to the feedback data in order to build a message. The message is transmitted to the receiving PLC modem, which uses the adaptive OFDM tonemap and the decoding eigenbeamforming matrix in order to generate the original message.

US Patent Application Publication No. 2008/0273613 A1, issued to Kol, entitled "Multiple input, multiple output (MIMO) communication system over in-premises wires" is directed to a multiple channel power line communication system. The system includes a plurality of MIMO devices. The MIMO devices are PLC devices, which utilize the in-premises power line network in order to transfer data. The in-premises power-line network includes a phase line (P), a neutral line (N) and a ground line (G). Each MIMO device may include a transmitter and a receiver. The transmitter may include a MIMO transmit processor and multiple analog front-ends (AFEs). The receiver may include a MIMO receive processor and multiple analog front-ends (AFEs). Each AFE included within the transmitter or the receiver may include a digital to analog converter (DAC), an analog to digital converter (ADC) and an analog and/or digital filters, mixers and amplifiers. Each AFE is connected to a pair of lines selected out of the phase, neutral and ground lines (i.e., P-N, N-G or P-G), where each such combination of lines forms a channel of communication. The transmit processor processes an input data stream to be transmitted. The transmit processor may generate two independent signals from a signal which is designated for transmission. The transmit processor then may transmit each independent signal by a different AFE, thereby by a different channel. AFEs within the receiver may receive the independent signals and process them. The received signals may include a contribution from the "straight path" (the channel through which they are connected) and the "cross path" (the channels through which they aren't connected). The receive processor utilizes information concerning the frequency-response of the different channels in order to reconstruct the two independent transmitted signals and to produce an output data stream. The channels may be also used to increase channel diversity by transmitting the same information through multiple channels. In this case, the transmit processor may include a space-time encoder and the receive processor may include a space-time decoder. The transceiver and receiver may each include a mode negotiator. The mode negotiator may select, with respect to each channel, between two modes: transmitting two independent signals (multiplexing) or transmitting the same signal through multiple channels (spatial diversity). The selection is made based on the measured channel characteristics and requested speed. In another embodiment, a single transceiver may communicate in a bidirectional manner with two different transceivers through two different channels, each channel including a combination of a pair of lines (P-N, N-G or P-G). Thus, two independent data streams may flow through two different channels simultaneously and use overlapping frequency bands.

An article entitled "MIMO for Inhome Power Line Communications," to L. Stadelmeier et al., is directed to MIMO schemes for inhome applications. In many parts of the world, the inhome installation includes three wires (Phase, Neutral and Ground) leading to three differential feeding possibilities: P-N, N-G, P-G. Only two out of the three possible combinations may be used in the transmitting end and all three may be used in the receiving end. Capacity calculations are performed in private flats and houses. The capacity may be calculated as the sum of two independent SISO channels. There may be several MIMO arrangements which differ in the number of transmit and receive ports. Two basic MIMO schemes may be applied to an OFDM based PLC system. One is spatial multiplexing, in which different signals are transmitted over different transmit ports and capacity gain is achieved. The other is space-time or space-frequency encoding, in which a signal is transmitted through multiple transmit ports, thereby obtaining diversity gain and increased certainty in the signal received. Measurements show that the MIMO schemes show better performance than the existing SISO schemes and show increases in channel capacity.

An article entitled "Space-Frequency Coded OFDM Systems for Multi-Wire Power Line Communications," to C. L. Giovaneli et al., published in the proceedings of the International Symposium on Power Line Communications and Its Applications, 2005, pages 191-195, is directed to a space-frequency coded orthogonal frequency-division multiplexing (OFDM) system for high-speed data transmission over frequency selective multi-phase power line channels. In the absence of channel knowledge at the transmitter end, frequency and space diversities are achieved by transmitting the same data symbol over two uncoupled wires and over two different carriers which are frequency-separated by carriers that are greater than the coherence bandwidth of the channels. It is assumed that channel state information is available at the receiver end. Different MIMO-OFDM techniques are known for power line channels which include four power line cables (three phase cables and neutral, e.g., access domain, large building or industrial plants). A basic multi-wire differential signaling structure used by the scheme proposed includes a transmitter and a receiver. The transmitter includes two elemental differential transmitters and a processor unit. The receiver includes two elemental differential receivers, a space-frequency (SF) linear combiner and a maximum-likelihood (ML) detector. Thus, the system utilizes two pairs of cables and forms two independent orthogonal SISO channels. The processor unit pre-codes the input data symbols prior to transmission and similarly pre-codes the orthogonal SISO-OFDM data symbols. The OFDM data symbols are transmitted serially over the two orthogonal SISO channels. The data symbols are received at each receiving point. The SF linear combiner realigns the output signals from one channel and its associated estimation with respect to the signals and estimation of the output signals of the other channel. After the realigning operation, the two signals include the same transmitted data symbol. The combiner additionally performs linear combining by using the method of maximal-ratio combining (MRC). The ML detector detects the optimal data symbol at the output of the SF linear combiner. Simulation results show that the proposed schemes perform significantly better than the conventional single-wire OFDM systems and that the symbol error rate (SER) of the proposed scheme outperforms the conventional SISO scheme when the power line channel is corrupted by impulsive noise.

SUMMARY OF THE INVENTION

It is an object of the disclosed technique to provide a novel method and system for power line modems in which the data transferred over electrical wires in a residence can be transferred over various pairs of wires in the residence, the wire pairs being coupled with a plurality of transmitters, the wire pair chosen for transferring data being selectable and being selected according to a respective carrier wave range or set a frequency carrier wave of the data is in, which overcomes the disadvantages of the prior art.

In accordance with the disclosed technique, there is thus provided a system for transmitting and receiving signals over residential electrical cables including at least one active wire, one neutral wire and one ground wire. The system includes at least two power line modems, each one of the power line modems coupling a respective electrical device with a respective electrical socket, each respective electrical socket being coupled with the residential electrical cables. Each one of the power line modems includes a processor, a plurality of transmitters and at least one receiver. The plurality of transmitters and the receiver are coupled with the processor. The plurality of transmitters is for transmitting the signals and the receiver is for receiving the signals. The processor determines a frequency carrier wave for the signals when the signals are transmitted. Each one of the plurality of transmitters and the receiver includes a coupling circuit for coupling each one of the power line modems to the residential electrical cables. The coupling circuit includes a first transformer and a second transformer. The first transformer includes a first network side winding, a first modem side winding and a center tap. The second transformer includes a second network side winding and a second modem side winding. Each of the first network side winding and the first modem side winding respectively includes two terminals. A first terminal of the first network side winding is coupled with the active wire and a second terminal of the first network side winding is coupled with the neutral wire. The center tap extends from a midpoint between the two terminals of the first network side winding. Each of the second network side winding and the second modem side winding respectively includes two terminals. A first terminal of the second network side winding is coupled with the center tap and a second terminal of the second network side winding is coupled with the ground wire. At least one receive wire pair is formed from at least two of the active wire, the neutral wire, the ground wire and the midpoint. At least one transmit wire pair is formed from at least two of the active wire, the neutral wire, the ground wire and the midpoint. The processor enables the receiver to be coupled with the receive wire pair and the plurality of transmitters to be coupled with the transmit wire pair. Each one of the plurality of transmitters defines a respective carrier wave set over the transmit wire pair. The processor provides the signals to a respective one of the plurality of transmitters according to the respective carrier wave set the frequency carrier wave of the signals is in.

BRIEF DESCRIPTION OF THE DRAWINGS

The disclosed technique will be understood and appreciated more fully from the following detailed description taken in conjunction with the drawings in which:

FIG. 5 is a schematic illustration of a modem of the prior art;

FIG. 6A is a schematic illustration of a receiver section of a switched PLC modem, constructed and operative in accordance with a further embodiment of the disclosed technique;

FIG. 6B is a schematic illustration of another receiver section of a switched PLC modem, constructed and operative in accordance with another embodiment of the disclosed technique;

FIG. 9A is a schematic illustration of a balanced coupling circuit for inductively coupling a PLC modem to a power line network including a transmitter section and a receiver section, constructed and operative in accordance with another embodiment of the disclosed technique.

DETAILED DESCRIPTION OF THE EMBODIMENTS

Figure 1:
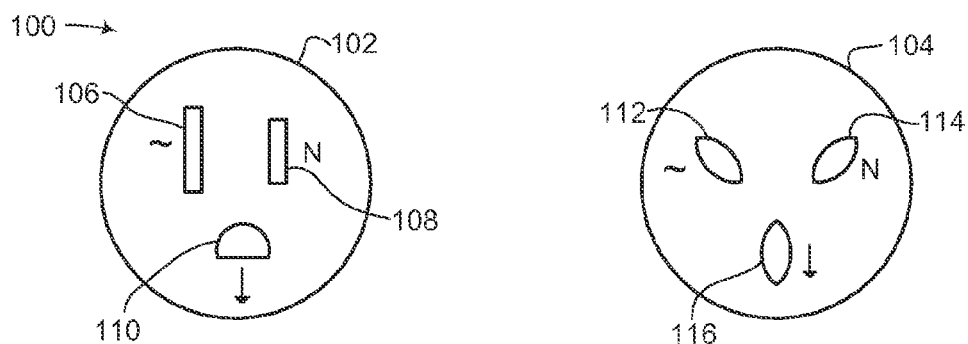
FIG. 1 is a schematic illustration of electrical sockets, constructed and operative in accordance with an embodiment of the disclosed technique.

The disclosed technique overcomes the disadvantages of the prior art by providing a novel power line modem configuration and PLC method for enabling the data transferred over electrical wires in a residence to be transferred over various pairs of wires in the residence. The wire pair chosen for transferring data is selected via a switch. By enabling the choice of which wire pair to transfer data on, transmission speeds are substantially improved over the prior art. In addition, data transfer rates are significantly improved in PLC systems with a minimal increase in manufacturing costs for producing PLC modems according to the disclosed technique Reference is now made to FIG. 1, is a schematic illustration of electrical sockets, generally referenced 100, constructed and operative in accordance with an embodiment of the disclosed technique. FIG. 1 shows two different types of electrical sockets, an electrical socket 102 and an electrical socket 104. Electrical socket 102 represents a Type B electrical socket as found in residences in North America and Japan. Electrical socket 104 represents a Type H electrical socket as found in residences in Israel. Electrical sockets 102 and 104 represent the shape and form of wall sockets to which electrical devices can be plugged into as well as the shape and form of electrical plugs which can be plugged into these sockets. As can be seen, each of electrical sockets 102 and 104 respectively includes three contacts. Electrical socket 102 includes a live contact 106, a neutral contact 108 and a ground contact 110. Electrical socket 104 includes a live contact 112, a neutral contact 114 and a ground contact 116. In general, electricity which is transferred to residences is transferred over electrical cabling in the residence which contains three wires. A first wire is known as the active, live, phase, line or hot wire (herein these terms are used interchangeably) and is usually symbolized on electrical plugs and sockets using the tilde symbol '~'. A second wire is known as the neutral, cold or return wire (herein these terms are used interchangeably) and is usually symbolized on electrical plugs and sockets using the capital letter 'N'. A third wire is known as the ground, earth, safety ground or safety earth wire (herein these terms are used interchangeably) and is usually symbolized on electrical plugs and sockets using the capital letter 'G' or an arrow pointing downwards as shown in FIG. 1 adjacent to ground contacts 110 and 116.

Each wire in the electrical cabling in a residence begins at an electric box (not shown), which is coupled with an electricity provider. It is through the electric box that electricity, or electric current, is provided to the residence from the electricity provider. From the electric box, electrical cabling is used to provide electricity to various electrical sockets in the residence. Each electrical cable coming out of the electric box eventually terminates at an electrical socket, with each wire in the electrical cable terminating at one of the contacts of the electrical socket. For example, regarding electrical socket 102, the live wire (not shown) terminates at live contact 106, the neutral wire (not shown) terminates at neutral contact 108 and the ground wire (not shown) terminates at ground contact 110. As shown in FIG. 1, each of the contacts is shaped or configured differently so that the wires in the electrical cable in a wall socket correspond to the wires in the electrical cable in a device plugged into the wall socket. In general, the live wire is used to transfer alternating current (herein abbreviated AC) electricity from the electric box to a load (i.e., an electrical device) plugged into a wall socket. The neutral wire is used to complete the electrical circuit back from the load to the electric box. The neutral wire is also used to dissipate static electricity charges which may buildup in the load. The ground wire is used to transfer electricity when a load has an insulation flaw, usually back to the electric box. The transferred electricity is used to blow a fuse or trip a circuit breaker in the electric box and substantially stops the transfer of electricity to the electrical socket in which the load was plugged into. Such is the case when the current drawn from the electrical socket by the load exceeds a predefined threshold. The ground wire is also used to dispose of unwanted electrical charges, as in the case of surge protectors.

In PLC, devices are coupled to one another in a network via the wires in the electrical cabling of a residence. In general, each device coupled to an electrical socket having a power line modem (i.e., it can transfer data over the electrical cabling of the residence) can be referred to as a node in a network. According to the disclosed technique, nodes can represent any electrical device in a residence which includes a power line modem, such as computers, printers, televisions, DVD players, air conditioners, ovens, fridges and the like. To transfer data between nodes, usually two wires (of the three wires present in an electrical cable), also known as a wire pair, are required. In general, since the data is transferred as electromagnetic radiation over the electric cabling of a residence, other sources of electromagnetic radiation in the vicinity may interfere with the data being transmitted. This interference is known as radio frequency (herein abbreviated RF) ingress. To overcome this interference a wire pair (i.e., two wires) in the electrical cabling is used as it is assumed that the RF ingress will radiate and interfere with the signals in all the wires in the electrical cabling by substantially the same amount. To extract the data from the signal, the difference in the signal between a wire pair is determined. Since the RF ingress is common to both wires, it is substantially eliminated in the difference calculation. In this respect, the transfer of data over a wire pair can be considered a differential transfer of data. By using a wire pair to transfer the data, the susceptibility of the wires to RF ingress is mitigated. Such a transmission mode is called a differential transmission mode.

In a single electrical cable, three wire pairs are present, the ~/N (live/neutral) wire pair, the N/G (neutral/ground) wire pair and the ~/G (live/ground) wire pair. In state of the art power line modems, the ~/N wire pair is used to transfer data.

In other words, in state of the art power line modems, data is transferred to and from nodes via the live and neutral wires in the electrical cabling in a residence. It is noted that a wire pair can be considered like a communication channel. Therefore, state of the art power line modems use a single communication channel for transferring data over electrical cables.

Figure 2:
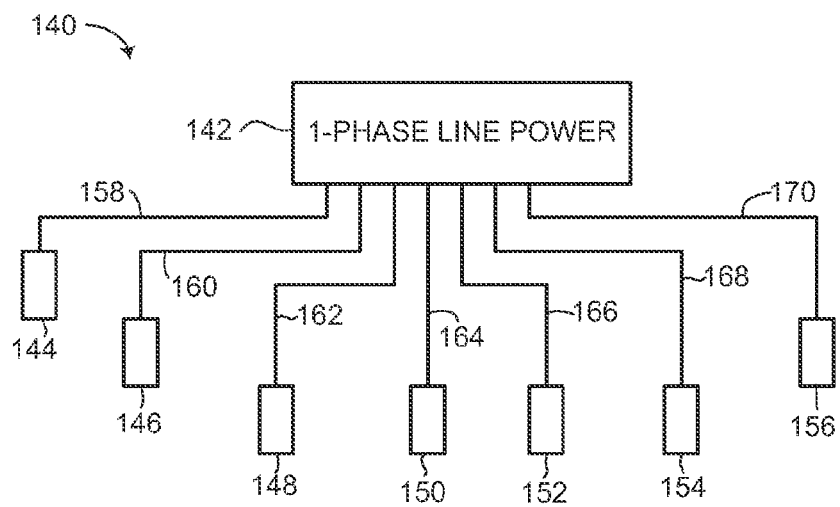
FIG. 2 is a schematic illustration of 1-phase and 3-phase electrical wiring in a residence, constructed and operative in accordance with another embodiment of the disclosed technique.
Figure 2:
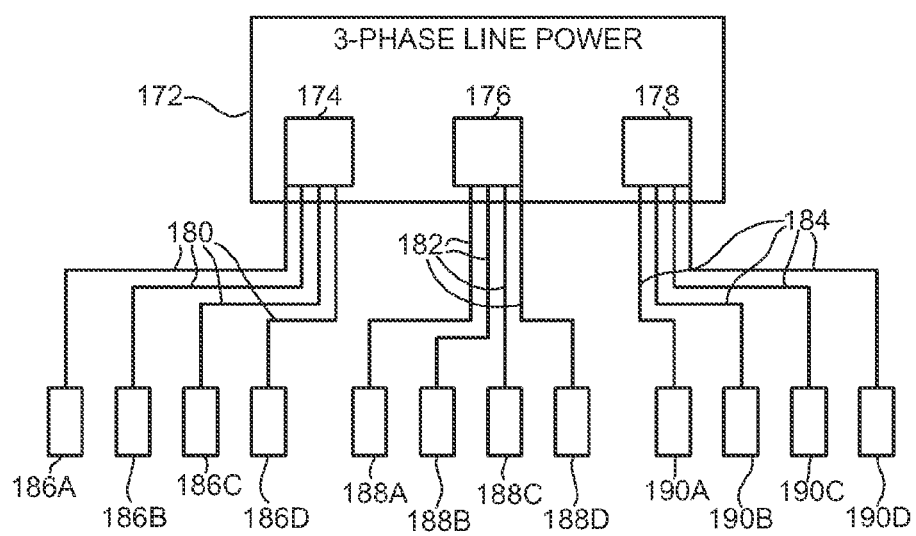

Reference is now made to FIG. 2, which is a schematic illustration of 1-phase and 3-phase electrical wiring in a residence, generally referenced 140, constructed and operative in accordance with another embodiment of the disclosed technique. In various countries, different methods are used by which electricity is distributed in a residence to its various electrical sockets. Shown in FIG. 2 are two of the main methods used to distribute electricity, commonly known as 1-phase electrical distribution and 3-phase electrical distribution. For example, all residential homes in France use 1-phase electrical distribution, whereas homes in Germany use 3-phase electrical distribution. In the USA, 2-phase electrical distribution, another method, is used to provide electricity to high power devices. Electrical wiring 140 includes a 1-phase line power electric box 142 (herein referred to as electric box 142), electrical sockets 144, 146, 148, 150, 152, 154 and 156, and electrical cables 158, 160, 162, 164, 166, 168 and 170. Electrical cable 158 couples electrical socket 144 to electric box 142, electrical cable 160 couples electrical socket 146 to electric box 142, electrical cable 162 couples electrical socket 148 to electric box 142, electrical cable 164 couples electrical socket 150 to electric box 142, electrical cable 166 couples electrical socket 152 to electric box 142, electrical cable 168 couples electrical socket 154 to electric box 142 and electrical cable 170 couples electrical socket 156 to electric box 142. Each of electrical cables 158, 160, 162, 164, 166, 168 and 170 includes a live wire, a neutral wire and a ground wire. Electrical wiring 140 also includes a 3-phase line power electric box 172 (herein referred to as electric box 172), a first main fuse 174, a second main fuse 176 and a third main fuse 178, a first set of electrical cables 180, a second set of electrical cables 182 and a third set of electrical cables 184, and electrical sockets 186A, 186B, 186C, 186D, 188A, 188B, 188C, 188D, 190A, 190B, 190C and 190D. First set of electrical cables 180 couples electrical sockets 186A, 186B, 186C and 186D to first main fuse 174, second set of electrical cables 182 couples electrical sockets 188A, 188B, 188C and 188D to second main fuse 176 and third set of electrical cables 184 couples electrical sockets 190A, 190B, 190C and 190D to third main fuse 178. It is noted that first set of electrical cables 180, second set of electrical cables 182 and third set of electrical cables 184 represent live wires going to each of electrical sockets 186A, 186B, 186C, 186D, 188A, 188B, 188C, 188D, 190A, 190B, 190C and 190D. For purposes of clarity and simplicity, the neutral wire and ground wire going to each electrical socket is not shown. In electric box 172, the neutral wire and the ground wire going to each of electrical sockets 186A, 186B, 186C, 186D, 188A, 188B, 188C, 188D, 190A, 190B, 190C and 190D originate from a single location (not shown) in the electric box and not from separate main fuses as shown in FIG. 2 regarding the live wire.

Electric box 142, as well as electric box 172, also known as the line power or the mains power, represents the location in a residence (not shown) where transmission lines (not shown) used by an electricity provider enter the residence. From electric box 142, electricity is provided throughout the residence via electrical cabling, such as electrical cables 158, 160, 162, 164, 166, 168 and 170, to various electrical sockets, such as electrical sockets 144, 146, 148, 150, 152, 154 and 156. In general, the electrical sockets will be located in various spaces and rooms in the residence, substantially covering the entire residence. Usually, every room in a residence has at least one electrical socket. In 1-phase electrical distribution, electricity is supplied to all electrical sockets in a residence at the same phase. In such a setup, an electrical device, i.e., a node, coupled to any electrical socket can communicate with another node coupled with any other electrical socket using a power line modem. For example, a computer (not shown), coupled with electrical socket 156, can communicate with a printer (not shown), coupled with electrical socket 146, via electrical cables 170 and 160, respectively and electric box 142. In 1-phase electrical distribution, since all electrical sockets are supplied with electricity at the same phase, i.e., substantially at the same time, the maximum load, or the maximum amount of electricity that can be used at any given time in the residence, is determined by government regulations of how much electricity, as measured in amperes, is provided to different types of residences. In some countries, the government regulation may be high enough that all the devices in a residence, especially devices that use a lot of electricity, such as air conditioners and ovens, can run simultaneously. In other countries, however, the government regulation may not be high enough that all the devices in a residence can run simultaneously, which may lead to situations where an air conditioner and a dishwasher, or an oven, may not be able to be run simultaneously in the residence, because the total amount of electricity required to run those devices is higher than the permitted amount of electricity which the residence can use in a given time period. Such a situation can be remedied using 3-phase electrical distribution.

In 3-phase electrical distribution, the electrical sockets are divided up into three groups. Electrical sockets in each group are supplied with electricity sequentially at different phases. For example, in electric box 172, each phase is represented by a different main fuse. First main fuse 174 represents a first phase, second main fuse 176 represents a second phase and third main fuse 178 represents a third phase. Electrical sockets 186A, 186B, 186C and 186D are on the first phase, electrical sockets 188A, 188B, 188C and 188D are on the second phase and electrical sockets 190A, 190B, 190C and 190D are on the third phase. By placing the electrical sockets of a residence on different phases, larger amounts of electricity can be used by devices in the residence while staying within the maximum amount of electricity being provided to the residence. In this respect, 3-phase electrical distribution enables more devices to run in a residence than 1-phase electrical distribution. On the other hand, since the different electrical sockets coupled with electric box 172 are on different phases, nodes on one phase cannot generally communicate with nodes on another phase, and if they can, it will be at a substantially lower data transfer rate as signal attenuation between nodes on different phases is substantially higher than signal attenuation between nodes on the same phase. As mentioned above, in state of the art power line modem, the ~/N wire pair is used to transfer data. In 1-phase electrical distribution, since all electrical sockets are on the same phase, nodes plugged into any electrical socket can communicate with one another at a substantially high data transfer rate. In 3-phase electrical distribution, since the electrical sockets in a residence are on one of three different phases, only nodes plugged into electrical sockets wired in the same phase (i.e., wired to the same main fuse) can communicate with one another at a substantially high data transfer rate using state of the art power line modems. For example, a computer (not shown) plugged into electrical socket 186A cannot communicate with a printer (not shown) plugged into electrical socket 190C at a substantially high data transfer rate using state of the art power line modems, since the two electrical sockets are on different phases. It is noted though that only the electricity transferred over the live wire is transferred sequentially at different phases. Regarding the neutral wire and the ground wire, they are common to all three phases. In other words, the neutral wire and ground wire to each electrical socket in a residence originate from the same location in electric box 172, whereas the live wires originate from one of first main fuse 174, second main fuse 176 or third main fuse 178. As described below in much greater detail, with reference to FIGS. 3A, 3B, 4A, 4B, 4C, 4D, 4E and 4F according to the disclosed technique, the wire pair in the electrical cables used to transfer data can be selected. In the case of 3-phase electrical distribution, if the N/G wire pair is selected, since this wire pair is common to all electrical sockets in the residence, then even nodes on different phases can communicate with one another at a substantially high data transfer rate. For example, a computer (not shown) plugged into electrical socket 186C could communicate with a printer (not shown) plugged into electrical socket 188D at a substantially high data transfer rate using a power line modem constructed according to the disclosed technique, since a common wire pair between phases can be selected as the wire pair used to transfer data over the electrical cables of the residence. It is also noted that in 3-phase electrical distribution, some of the electrical sockets (not shown) may be coupled with all three phases. Such is the case usually for electrical sockets meant for high amperage devices, such as air conditioners and ovens.

Figure 3A:
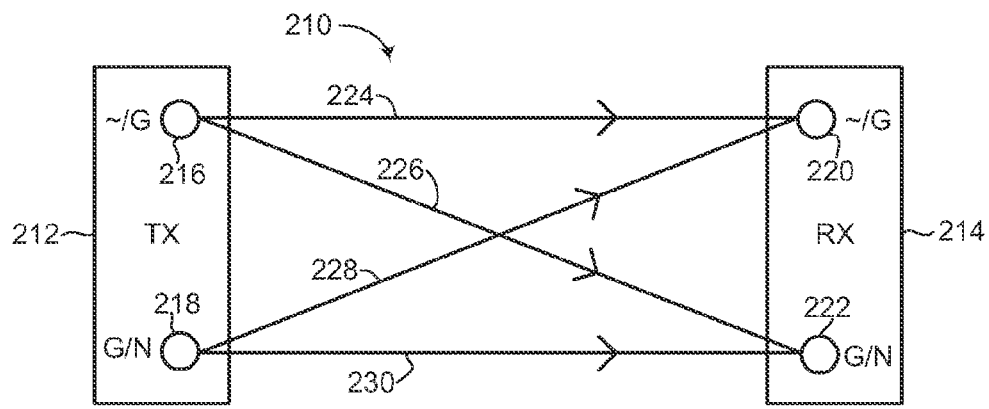
FIG. 3A is a schematic illustration of the communication channels in a MIMO PLC network, constructed and operative in accordance with a further embodiment of the disclosed technique.

Reference is now made to FIG. 3A, which is a schematic illustration of the communication channels in a multiple-input multiple-output (herein abbreviated MIMO) PLC network, generally referenced 210, constructed and operative in accordance with a further embodiment of the disclosed technique. In the art of analog and digital communication, the physical medium over which a signal can be transferred can be referred to as a channel. For example, in old telephone switchboard systems, each set of wires over which telephone signals were transmitted represented different channels. If all channels were in use, then no new telephone signals could be sent by a new user (i.e., no new telephone calls could be made). In digital communication, the frequency, or frequency range used to transmit data (i.e., a signal) can also be referred to as a channel, such as the channels radio stations use to transmit radio broadcasts. In order to transfer a signal over a channel, a transmitter is required to send, i.e. transmit, the signal over the channel. The signal is then received by a receiver coupled with the same channel, which accepts the signal. For example, a radio signal transmitted by a transmitter at 99.9 megahertz (herein abbreviated MHz) can be received by a radio tuned to 99.9 MHz, i.e., the receiver in the radio is set to the specific channel, 99.9 MHz, used to transmit the radio signal. In the field of digital communication, devices which can transmit and receive signals (i.e. data) over various types of cables, such as fiber optic cables, telephone wires, Ethernet cables and electrical cables, are substantially referred to as modems. Modems may be designed to transmit data over a single channel or over a plurality of channels. State of the art modems usually have one transmitter and one receiver.

In the field of radio, cellular and wireless communication, various types of communication configurations are known in the art. One such configuration is known as a MIMO configuration, in which multiple transmitters transmit a signal over multiple channels and multiple receivers are used to receive the signal transmitted over the multiple channels. According to the disclosed technique, a MIMO configuration is used in a PLC network, as described below. In a PLC network, the various wire pairs, ~/N, N/G and ~/G can be considered as different communication terminals which can each access a direct communication channel and two crosstalk communication channels. Since electrical cables have three wires, two wire pairs, for example ~/N and N/G, can be used to send two independent differential signals over the electrical cables. FIG. 3A includes a transmitter 212, a receiver 214, a ~/G transmitting wire pair 216, a G/N transmitting wire pair 218, a ~/G receiving wire pair 220, a G/N receiving wire pair 222, a first direct transmission channel 224, a first crosstalk transmission channel 226, a second crosstalk transmission channel 228 and a second direct transmission channel 230. It is noted that first direct transmission channel 224, first crosstalk transmission channel 226, second crosstalk transmission channel 228 and second direct transmission channel 230 do not represent the physical wiring coupling transmitter 212 and receiver 214, but rather the communication channel model between transmitter 212 and receiver 214. The direct transmission channels may coincide with particular wire pairs, but the crosstalk communication channels do not. For purposes of simplicity, the term transmitter will herein be abbreviated TX and the term receiver will herein be abbreviated RX. TX 212 and RX 214 are coupled via the transmission channels shown, meaning the transmission channels shown represent the various channels through which data can be transferred from TX 212 to RX 214. In general, TX 212 is part of a modem (not shown) which is coupled with a node (which may be a computer, printer, television and the like—also not shown). RX 214 is also part of a modem (not shown), which is coupled with another node in a network (not shown). For purposes of simplicity and to demonstrate the disclosed technique, only the TX of the node transmitting a signal is shown and only the RX of the node receiving the signal is shown in this Figure as well as in FIGS. 3B, 4A, 4B, 4C, 4D, 4E and 4F. As mentioned above, each node will have a modem coupled with it, the modem including a TX and an RX, meaning each node can communicate (i.e., transmit and receive) with every other node. Also in general, a TX and an RX are each coupled to respective processors which can modify, code/decode and process data signals.

As FIG. 3A is a schematic illustration, each wire pair is shown as being separate. In a real electrical cable, only three wires are present and any two wire pairs will have a wire in common. According to the disclosed technique, each wire pair can be considered a different communication terminal by which the TX can transmit a signal. In a MIMO configuration, each TX transmits a signal to each RX. In FIG. 3A, each wire pair can be considered a different communication terminal for transmitting and receiving. Therefore, ~/G transmitting wire pair 216 can be considered a first transmission communication terminal, G/N transmitting wire pair 218 can be considered a second transmission communication terminal, ~/G receiving wire pair 220 can be considered a first receiving communication terminal and G/N receiving wire pair 222 can be considered a second receiving communication terminal. In the MIMO configuration of FIG. 3A, each transmitter transmits a signal to each receiver via one of four different transmission channels. ~/G transmitting wire pair 216 transmits a signal using first direct transmission channel 224 to ~/G receiving wire pair 220. G/N transmitting wire pair 218 transmits a signal using second direct transmission channel 230 to G/N receiving wire pair 222. ~/G transmitting wire pair 216 also transmits a signal using first crosstalk transmission channel 226 to G/N receiving wire pair 222 and G/N transmitting wire pair 218 also transmits a signal using second crosstalk transmission channel 228 to ~/G receiving wire pair 220. A direct transmission channel is when both the receiving communication terminal and the transmission communication terminal are on the same wire pair. In this respect, the wire pair represents a physical channel, as in the case shown in FIG. 3A of first direct transmission channel 224 and second direct transmission channel 230. Since the data being transmitted over electrical cables is electromagnetic radiation and due to the fact that in an electrical cable the three wires are substantially parallel and adjacent to one another, a second wire pair can pick up the signal being transferred over a first wire pair. This is represented in FIG. 3A as a crosstalk transmission channel. Crosstalk transmission channels exist in electrical cables, therefore even though ~/G transmitting wire pair 216 and G/N receiving wire pair 222 are different wire pairs, the wire pairs can nonetheless transfer signals from one to the other. It is noted that the choice of wire pairs shown in FIG. 3A (~/G and G/N) is just illustrative and that any two of the three possible wire pairs in an electrical cable can be used as the transmitting wire pairs and the receiving wire pairs. In addition, the wire pairs in TX 212 and in RX 214 do not need to match up. All that is required for the configuration of FIG. 3A is that the TX transmit data over two wire pairs and that two wire pairs receive the transmitted data. For example, the two transmitting wire pairs in FIG. 3A could be a ~/G wire pair and an N/G wire pair (as shown in the figure) and the two receiving wire pairs could be a ~/N wire pair and N/G wire pair.

It is noted that the communication channels shown in FIG. 3A are always present in a PLC communication network. In other words, the signal transmitted over ~/G transmitting wire pair 216 is received by both ~/G receiving wire pair 220 and G/N receiving wire pair 222. Likewise, the same signal is transmitted over G/N transmitting wire pair 218 and is received by both ~/G receiving wire pair 220 and G/N receiving wire pair 222. The processor (not shown) coupled with RX 214 can separate the data which originated from each wire pair, as is known in the art. Below, in FIGS. 3B, 4A, 4B, 4C, 4D, 4E and 4F, different embodiments of the disclosed technique are shown, and it is noted that in each of these embodiments, the communication channels that are shown in FIG. 3A exist in these embodiments as well because nodes (not shown) are coupled via electrical cables which have three wires and therefore three wire pairs. In other words, the physical coupling of a transmitter and a receiver in a PLC network using electrical cables enables the communication channels in FIG. 3A between TX 212 and RX 214 to be present in each of the embodiments shown below, even though is some of these embodiments, the data from a particular communication channel is discarded or not processed by a processor (not shown).

Figure 3B:
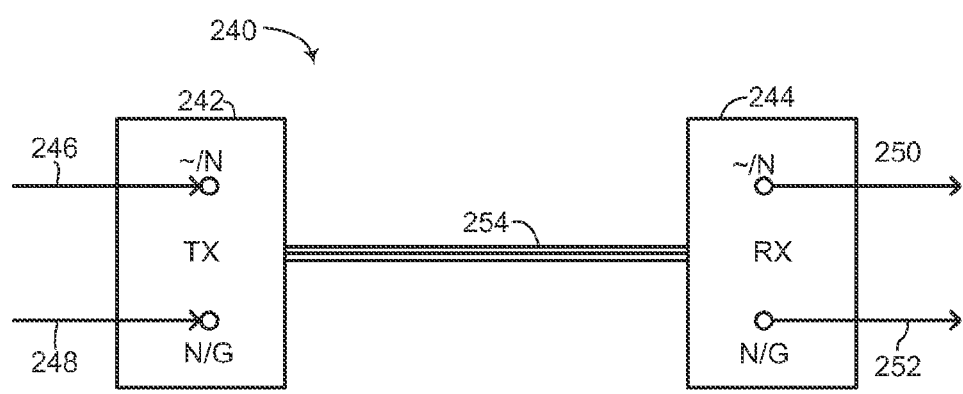
FIG. 3B is a schematic illustration of a MIMO PLC network between two nodes, constructed and operative in accordance with another embodiment of the disclosed technique.

Reference is now made to FIG. 3B, which is a schematic illustration of a MIMO PLC network between two nodes, generally referenced 240, constructed and operative in accordance with another embodiment of the disclosed technique. FIG. 3B can be viewed as an illustration of a MIMO PLC network system. MIMO PLC network 240 includes a TX 242 and an RX 244. As mentioned in FIG. 3A, TX 242 is part of a modem (not shown) which is coupled with a node (not shown) and RX 244 is also part of another modem (not shown), which is also coupled with another node (not shown). Each modem may also include a processor (not shown). TX 242 and RX 244 are coupled via electrical cable 254. TX 242 receives a first analog signal 246 and a second analog signal 248. First analog signal 246 is transmitted along electrical cable 254 via the ~/N wire pair and second analog signal 248 is transmitted along electrical cable 254 via the N/G wire pair. The wire pairs along which first analog signal 246 and second analog signal 248 are transmitted to RX 244 are arbitrary and for illustrative purposes only; any two of the three possible wire pairs in an electrical cable could have been used as the wire pairs for transmitting the analog signals. RX 244 receives first analog signal 246 and second analog signal 248 and outputs them as a first analog signal 250 and a second analog signal 252. It is noted that first analog signal 246 was transmitted over the direct communication channel of the ~/N wire pair but was also coupled via the crosstalk communication channel to second analog signal 252 received on the N/G wire pair. Likewise, second analog signal 248 was transmitted over the direct communication channel of the N/G wire pair but was also coupled via the crosstalk communication channel to first analog signal 250 received on the ~/N wire pair. In RX 244, first analog signal 250 represents the signal sent over the ~/N wire pair as well as the signal sent over the N/G wire pair and second analog signal 252 represents the signal sent over the N/G wire pair as well as the signal sent over the ~/N wire pair. In the processor (not shown) coupled with RX 244, the original data which was modulated and used to generate the analog signals transmitted on each wire pair is separated. As shown in FIG. 3A, in a MIMO configuration, a signal is transmitted over two wire pairs on the side of the transmitter and received by two wire pairs on the side of the receiver, i.e., there are four communication channels between TX 242 and RX 244 as was shown in FIG. 3A. In addition, the two wire pairs on each of the transmitter side and the receiver side do not need to be the same.

In state of the art power line modems, only one wire pair is used to transmit data, which can result in a substantially low data transfer rate of approximately 30 megabits per second (herein abbreviated Mbps) having a coverage of 90%. In general, the data transfer rates between nodes in a network over electrical cables can have a wide range which depend on the distance between the nodes as well as the number and type of electrical devices coupled with the various outlets in a residence where the network is located. Coverage refers to the percent of users that attain a given minimal data transfer rate after taking into account the factors which can affect data transfer rates and which are different amongst users. In MIMO PLC network 240, since more than one wire pair is used to transmit and receive a signal, the data transfer rate can be increased substantially. For example, if the signal transmitted over the crosstalk communication channels is weak, then the two substantially independent direct communication channels can be used to transmit twice the amount of data, i.e., substantially twice the rate, over a single direct communication channel, having a high signal to noise ratio (herein abbreviated SNR) while using the same amount of power to transmit the data. Data transfer rates are increased by sending different signals using different wire pairs simultaneously. Data transfer rates are also increased by sending the same signal using different wire pairs simultaneously, thereby increasing the reliability and strength of the signal transferred. It is noted that the network configuration in FIG. 3B is between two nodes. In the embodiment of the disclosed technique shown in FIG. 3B, signals are transmitted from a TX to an RX in a PLC network using a MIMO configuration. In many residential configurations, errors in the signals received over a particular wire pair may significantly affect the quality of the signal transmitted, thereby not enabling the full increase in data transfer rate in a MIMO configuration to be achieved. Nevertheless, increases in the data transfer rate in a PLC network can be achieved via a switched PLC network as described below in FIG. 4A.

Figure 4A:
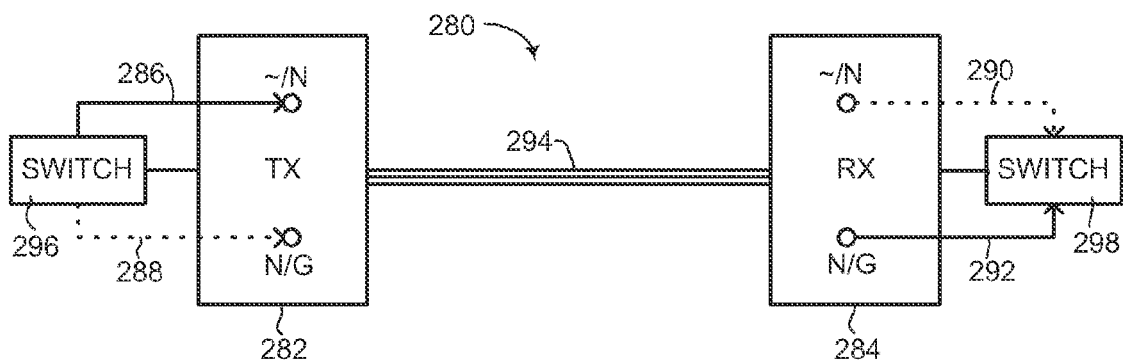
FIG. 4A is a schematic illustration of a first embodiment of a switched PLC network between two nodes, constructed and operative in accordance with a further embodiment of the disclosed technique.

Reference is now made to FIG. 4A, which is a schematic illustration of a first embodiment of a switched PLC network between two nodes, generally referenced 280, constructed and operative in accordance with a further embodiment of the disclosed technique. Switched PLC network 280 includes a TX 282 and an RX 284. As mentioned in FIG. 3A, TX 282 is part of a modem (not shown) which is coupled with a node (not shown) and RX 284 is also part of another modem (not shown), which is also coupled with another node (not shown). A switch 296 is coupled with TX 282 and a switch 298 is coupled with RX 284. Both switch 296 and switch 298 may be respectively coupled to respective processors (not shown). TX 282 is coupled with RX 284 via electrical cable 294. The embodiment depicted in FIG. 4A is a double switched PLC network. TX 282 is wired to transmit an analog signal either over a ~/N wire pair or an N/G wire pair, depending on the position of switch 296. In FIG. 4A, a first analog signal 286 is provided to TX 282 which transmits it over the ~/N wire pair. First analog signal 286 is depicted as a solid line. If switch 296 was switched to its other position, then a second analog signal 288 would be provided to TX 282 which would transmit it over the N/G wire pair. Second analog signal 288 is depicted by a dotted line. Likewise RX 284 is wired to receive an analog signal either over a ~/N wire pair or an N/G wire pair, depending on the position of switch 298. In FIG. 4A, a second analog signal 292 is provided to RX 284 which received it over the N/G wire pair. Second analog signal 292 is depicted as a solid line. If switch 298 was switched to its other position, then a first analog signal 290 would be provided to RX 284 which would receive it over the ~/N wire pair. First analog signal 290 is depicted by a dotted line. As explained below, in FIG. 4A only one wire pair in each of TX 282 and RX 284 has been selected to transmit and receive, respectfully, a signal. Due to the nature of the communication channels in a PLC network, when TX 282 transmits first analog signal 286 over the ~/N wire pair, the signal is also transmitted over the crosstalk communication channel, which is why RX 284 can be set to receive the transmitted signal on the N/G wire pair as second analog signal 292. As mentioned above, the choice of wire pairs to transmit and receive is arbitrary as any of the three possible wire pairs can be used.

In general, electrical wires in a residence are noisy conductors. The noise results from many factors and can change over time. Some of these factors include the type of devices coupled to particular electrical sockets in the residence, the physical layout of the electrical wiring in a house, which is usually substantially branched in nature as well as RF ingress from devices in the vicinity (e.g., such as amateur radio equipment). In addition, signal attenuation on electrical wires may be substantially large as electrical cabling is not usually manufactured to handle the frequencies used in PLC (e.g., frequencies in the MHz range and higher) and protective elements for electrical devices plugged into the residence, such as surge protectors, may increase signal loss at high frequencies, such as those used in PLC. Due to these factors, different wire pairs may exhibit different transmission characteristics, such as different time-dependent noise characteristics. According to the disclosed technique, a switch is provided on the transmission side of a signal and on the receiving side of the signal which enables the wire pair used to transmit the signal to be selected as well as the channel used by the receiver to receive the signal. Depending on these factors, at a given time interval, a particular wire pair may be less noisy than another wire pair. In switched PLC network 280, switch 296 enables TX 282 to transmit a signal over a first wire pair, such as the ~/N wire pair or over a second wire pair, such as the N/G wire pair. Switch 298 enables RX 284 to receive a signal over a first wire pair, such as the ~/N wire pair 290 or over a second wire pair, such as the N/G wire pair. Switch 296 enables different wire pairs to be selected to transmit an analog signal whereas switch 298 enables different wire pairs to be selected to receive an analog signal. The switching of switches 296 and 298 may be controlled by respective processors which can respectively dynamically switch which wire pair TX 282 will transmit over and which wire pair RX 284 will receive over. Depending on the wire pair selected in RX 284, either a direct communication channel or a crosstalk communication channel is selected for receiving signals. In the example shown in FIG. 4A, a ~/N wire pair has been selected to transmit first analog signal 286, with an N/G wire pair selected to receive second analog signal 292. By selecting an N/G wire pair, which is a different wire pair than the ~/N wire pair, a crosstalk transmission channel has been selected for transferring a signal from TX 282 to RX 284. Had switch 298 selected a ~/N wire pair for receiving a signal from TX 282, a direct transmission channel would have been set up for transferring a signal from TX 282 to RX 284. As described below in FIGS. 6A-6F, a PLC modem constructed according to the disclosed technique can check the noise level and quality of each wire pair and determine, for a given time interval, which wire pair on the side of the transmitter and which wire pair on the side of the receiver should be used to achieve a substantially high quality signal. It is noted that the network configuration shown in FIG. 4A is between two nodes. According to the disclosed technique, the choice of which wire pair on the side of the transmitter and which wire pair on the side of the receiver is used to transmit and receive a signal is determined between two nodes. In a network with a plurality of nodes, each node has to negotiate with each other node regarding which wire pair on the side of the transmitter and which wire pair on the side of the receiver is to be used between the two nodes.

As mentioned above, state of the art power line modems use the ~/N wire pair for transferring signals between nodes. Also, as mentioned above, in 3-phase electrical distribution, the N/G wire pair is common to all three phases, unlike the ~ wire, which transfers electricity in three sequential phases. According to the embodiment in FIG. 4A, if two nodes in a 3-phase electrical distribution residence are located on different phases, then the nodes can communicate at a substantially high data transfer rate with one another by selecting to use the N/G wire pair on the side of the TX of one node and on the side of the RX of the other node for transferring signals. In addition, an increased number of electrical appliances coupled with electrical sockets of a particular phase (either 1-phase electrical distribution or 3-phase electrical distribution) may increase the noise level on the ~/N wire pair. According to the disclosed technique, the wire pair selected to transmit and receive signals can be changed depending on the noise level of each wire pair. For example, if the noise level on the ~/N is substantially high, because many electrical appliances are plugged in, then the N/G wire pair can be selected for transferring signals. Even though the noise from the ~/N wire pair may still be received in the RX on the N/G wire pair, the noise received would be from the crosstalk transmission channel, which is usually an attenuated signal, thereby resulting in less noise received with the signal. If the noise level of the ~/N reduces, because the electrical appliances are unplugged, then the TX of one node and/or RX of the other node can switch back to using the ~/N wire pair to transfer signals if a higher quality signal can be sent on that wire pair. Also, some surge protectors, for example those commonly found in the USA, are constructed such that in a power strip (also known as a power bar), the surge protector is located between the ~ wire and the N wire of the power strip. Signals transmitted via the power strip at high frequencies (e.g., frequencies in the MHz range), commonly used by power line modems, on the ~/N wire pair experience a significant amount of signal attenuation because of the surge protectors. Significantly less attenuation is experienced by signals in such power strips on the N/G wire pair. Therefore, according to the disclosed technique, if a node is coupled with an electrical socket via a surge protector, the N/G wire pair can be used to transfer signals if the amount of attenuation of the ~/N wire pair is substantially high.

As described below in greater detail in FIGS. 6A-6F, both TX 282 and RX 284 are coupled with respective modems, which may include processors (not shown) and other electronics (not shown). These processors and other electronics are enabled to verify and check the various transmission channels available to determine which wire pair should be used to transfer data most efficiently. Methods and systems for checking the quality of a transmission channel are known in the art. According to an embodiment of the disclosed technique, the quality of each transmission channel is verified and checked at specific time intervals, which may be on the order of milliseconds, seconds, minutes or hours. Depending on the result of the check or verification, the wire pairs used to transfer signals between two nodes may be changed using switches 296 and 298. In one embodiment of the disclosed technique, the transmission side does the quality check of the wire pairs and channels and instructs the receiving side which wire pair to use. In another embodiment of the disclosed technique, the receiving side does the quality check of the wire pairs and channels and instructs the transmission side which wire pair to use. According to other embodiments of the disclosed technique, as shown in below in FIGS. 4B and 4C, depending on various conditions, switch 296 may be disabled, switch 298 may be disabled, or both switches may be disabled, such that either TX 282, RX 284 or both work in a static manner, transmitting signals using a particular wire pair and receiving signals over a particular transmission channel. Such conditions can include financial considerations as well as the complexity of a PLC network and system.

Figure 4B:
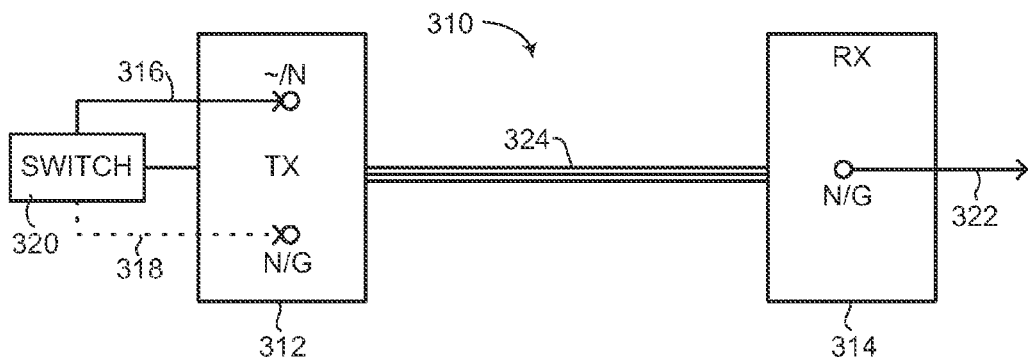
FIG. 4B is a schematic illustration of a second embodiment of a switched PLC network between two nodes, constructed and operative in accordance with another embodiment of the disclosed technique.

Reference is now made to FIG. 4B, which is a schematic illustration of a second embodiment of a switched PLC network between two nodes, generally referenced 310, constructed and operative in accordance with another embodiment of the disclosed technique. Switched PLC network 310 includes a TX 312 and an RX 314. As mentioned in FIG. 3A, TX 312 is part of a modem (not shown) which is coupled with a node (not shown) and RX 314 is also part of another modem (not shown), which is also coupled with another node (not shown). A switch 320 is coupled with TX 312. Switch 320 may be coupled to a processor (not shown). TX 312 is coupled with RX 314 via electrical cable 324. The embodiment depicted in FIG. 4B is a single switched PLC network. TX 312 is wired to transmit an analog signal either over a ~/N wire pair or an N/G wire pair, depending on the position of switch 320. In FIG. 4B, a first analog signal 316 is provided to TX 312 which transmits it over the ~/N wire pair. First analog signal 316 is depicted as a solid line. If switch 320 were switched to its other position, then a second analog signal 318 would be provided to TX 312 which would transmit it over the N/G wire pair. Second analog signal 318 is depicted by a dotted line. RX 314 is wired to receive an analog signal only over an N/G wire pair. In FIG. 4B, an analog signal 322 is provided to RX 314 which received it over the N/G wire pair.

Switched PLC network 310 functions substantially like switched PLC network 280 (FIG. 4A), except that only the transmission side is equipped with a switch. In FIG. 4B only one wire pair in TX 312 has been selected to transmit a signal, whereas one wire pair in RX 314 has been determined (i.e., via the wiring) to receive a signal. Due to the nature of the communication channels in a PLC network, when TX 312 transmits first analog signal 316 over the ~/N wire pair, the signal is also transmitted over the crosstalk communication channel, which is why RX 314 can receive the transmitted signal on the N/G wire pair as analog signal 322. As mentioned above, the choice of wire pairs to transmit and receive is arbitrary as any of the three possible wire pairs can be used. In other words, for example, RX 314 could have been wired to only receive signals on the ~/N wire pair or on the ~/G wire pair. In this embodiment, either the processor (not shown) coupled with TX 312 or the processor (not shown) coupled with RX 314 may check the quality of the transmission channels to instruct switch 320 which wire pair should be used to transmit data. It is noted that in the embodiment shown in FIG. 4B, the wire pair in TX 312 not used for transmitting signals may nonetheless transmit signals at predefined time intervals, according to instructions received by the processor coupled with TX 312 or the processor coupled with RX 314. These transmitted signals can be used to periodically monitor the transmission quality of the wire pair not currently being used by TX 312.

Figure 4C:
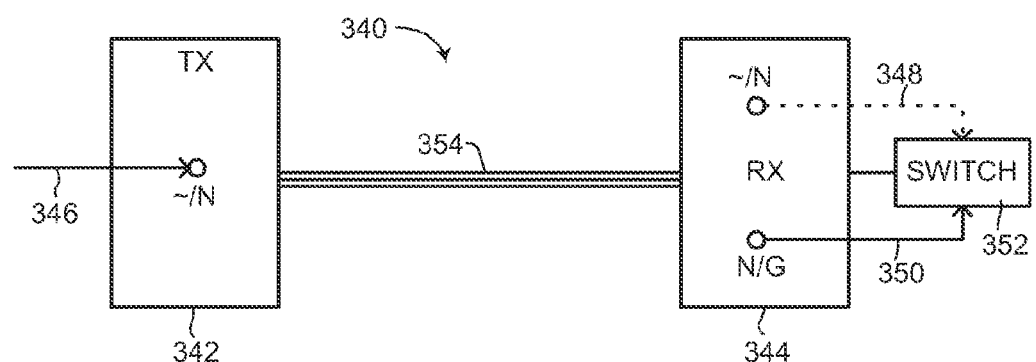
FIG. 4C is a schematic illustration of a third embodiment of a switched PLC network between two nodes, constructed and operative in accordance with a further embodiment of the disclosed technique.

Reference is now made to FIG. 4C, which is a schematic illustration of a third embodiment of a switched PLC network between two nodes, generally referenced 340, constructed and operative in accordance with a further embodiment of the disclosed technique. Switched PLC network 340 includes a TX 342 and an RX 344. As mentioned in FIG. 3A, TX 342 is part of a modem (not shown) which is coupled with a node (not shown) and RX 344 is also part of another modem (not shown), which is also coupled with another node (not shown). A switch 352 is coupled with RX 344. Switch 352 may be coupled to a processor (not shown). TX 342 is coupled with RX 344 via electrical cable 354. The embodiment depicted in FIG. 4C is a single switched PLC network. TX 342 is wired to transmit an analog signal over a ~/N wire pair. In FIG. 4C, an analog signal 346 is provided to TX 342 which transmits it over the ~/N wire pair. RX 344 is wired to receive either a first analog signal 348 over a ~/N wire pair or a second analog signal 350 over an N/G wire pair, depending on the position of switch 352. In the figure, RX 344 is switched to receive second analog signal 350 over the N/G wire pair. Second analog signal 350 is depicted as a solid line. If switch 352 were switched to its other position, then a first analog signal 348 would be provided to RX 344 which would receive it over the ~/N wire pair. First analog signal 348 is depicted by a dotted line.

Switched PLC network 340 functions substantially like switched PLC network 280 (FIG. 4A), except that only the receiving side is equipped with a switch. In FIG. 4C only one wire pair in RX 344 has been selected to receive a signal, whereas one wire pair in TX 342 has been determined (i.e., via the wiring) to transmit a signal. Due to the nature of the communication channels in a PLC network, when TX 342 transmits analog signal 346 over the ~/N wire pair, the signal is also transmitted over the crosstalk communication channel, which is why RX 344 can receive the transmitted signal on the N/G wire pair as second analog signal 350. As mentioned above, the choice of wire pairs to transmit and receive is arbitrary as any of the three possible wire pairs can be used. In other words, for example, TX 342 could have been wired to only transmit signals on the N/G wire pair or on the ~/G wire pair. In this embodiment, either the processor (not shown) coupled with TX 342 or the processor (not shown) coupled with RX 344 may check the quality of the transmission channels to instruct switch 352 which wire pair should be used to receive data.

Figure 4E:
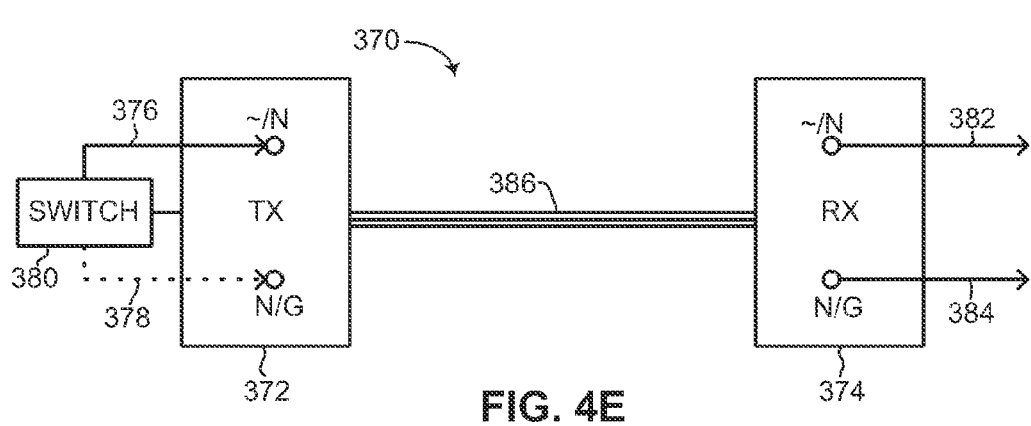
FIG. 4E is a schematic illustration of a switched MRC PLC network between two nodes, constructed and operative in accordance with a further embodiment of the disclosed technique.
Figure 4D:
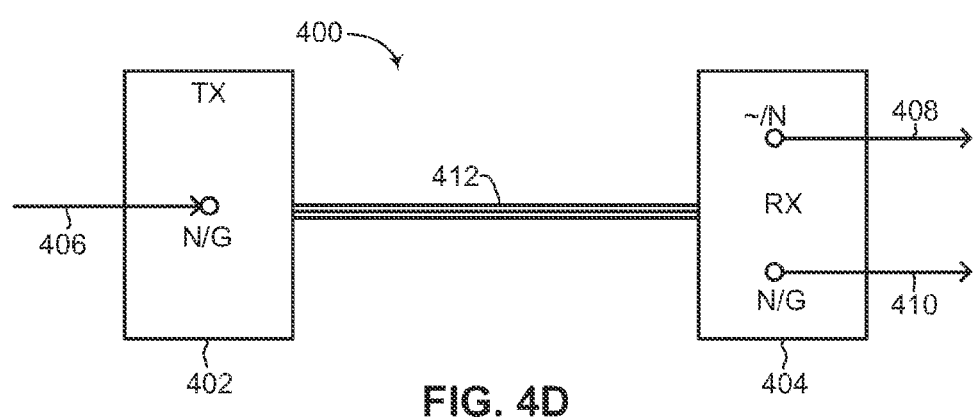
FIG. 4D is a schematic illustration of an MRC PLC network between two nodes, constructed and operative in accordance with another embodiment of the disclosed technique.

Reference is now made to FIG. 4D, which is a schematic illustration of a maximal ratio combining (herein abbreviated MRC) PLC network between two nodes, generally referenced 400, constructed and operative in accordance with another embodiment of the disclosed technique. MRC PLC network 400 includes a TX 402 and an RX 404. As mentioned in FIG. 4A, TX 402 is part of a modem (not shown) which is coupled with a node (not shown) and RX 404 is also part of another modem (not shown), which is also coupled with another node (not shown). TX 402 is coupled with RX 404 via electrical cable 412. TX 402 is wired to transmit an analog signal 406 over an N/G wire pair. RX 404 receives a first analog signal 408 over the ~/N wire pair and a second analog signal 410 over the N/G wire pair. In FIG. 4D, only one wire pair is used by TX 402 to transmit a signal. It is noted that the wire pair which TX 402 is wired to in FIG. 4D is arbitrary and that any of the three possible wire pairs could have been chosen. The same goes for the wire pairs used in RX 404 to receive the transmitted signal.

FIG. 4D shows another embodiment of a PLC network. In this embodiment, TX 402 transmits one wire pair whereas RX 404 receives the signal over two wire pairs. The configuration shown in FIG. 4D uses a technique known as MRC regarding the signals received in RX 404. Recall that RX 404 receives a signal via the direct communication channel over the ~/N wire pair, as first analog signal 408 and another version of the same signal again via the crosstalk communication channel over the N/G wire pair, as second analog signal 410. In MRC, two signals are received by a receiver, one on a direct transmission channel and another on a crosstalk transmission channel. In one embodiment of the MRC technique, depending on the quality of the signals received, the receiver decides which signal received from which channel is provided for further processing. In another embodiment of the MRC technique, the processor (not shown) coupled with the receiver, decides which signal received is provided for further processing. In a further embodiment of the MRC technique, a weighted calculation is performed on the two signals received on each wire pair to optimally combine them.

Reference is now made to FIG. 4E, which is a schematic illustration of a switched MRC PLC network between two nodes, generally referenced 370, constructed and operative in accordance with a further embodiment of the disclosed technique. Switched MRC PLC network 370 includes a TX 372 and an RX 374. As mentioned in FIG. 4A, TX 372 is part of a modem (not shown) which is coupled with a node (not shown) and RX 374 is also part of another modem (not shown), which is also coupled with another node (not shown). TX 372 is coupled with RX 374 via electrical cable 386. A switch 380 is coupled with TX 372. TX 372 can transmit a first analog signal 376 over a ~/N wire pair and a second analog signal 378 over an N/G wire pair, depending on the position of switch 380. RX 374 receives a first analog signal 382 over the ~/N wire pair and a second analog signal 384 over the N/G wire pair. In FIG. 4E only one wire pair is used by TX 372 to transmit a signal, therefore TX 372 transmits first analog signal 376, shown as a solid line in the figure. If switch 380 were set to its other position, then TX 372 would transmit second analog 378, shown as a dotted line in the figure.

FIG. 4E shows another embodiment of the switched PLC network. In this embodiment, TX 372 transmits over one selected wire pair at any given time interval whereas RX 374 receives the signal over two wire pairs. The configuration shown in FIG. 4E uses a technique known as MRC regarding the signals received in RX 374. Recall that RX 374 receives a signal via the direct communication channel over the ~/N wire pair, as first analog signal 382 and the same signal again via the crosstalk communication channel over the N/G wire pair, as second analog signal 384. In MRC, two signals are received by a receiver, one on a direct transmission channel and another on a crosstalk transmission channel. In one embodiment of the MRC technique, depending on the quality of the signals received, the receiver decides which signal received from which channel is provided for further processing. In another embodiment of the MRC technique, the processor (not shown) coupled with the receiver, decides which signal received is provided for further processing. For example, in FIG. 4E, a processor (not show) coupled with RX 374 may check the signal received on the ~/N wire pair and on the N/G wire pair. If the quality of the signal received on the N/G wire pair (i.e., the crosstalk transmission channel) is higher than the quality of the signal received on the ~/N wire pair (i.e., the direct transmission channel), then the processor may only process the signal received on the N/G wire pair and discard the signal received on the ~/N wire pair. In a further embodiment of the MRC technique, a weighted calculation is performed on the two signals received on each wire pair to optimally combine them. For example, in FIG. 4E, the signal received on the ~/N wire pair may be optimally combined with the signal received on the N/G wire pair in a processor (not shown), by combining a first portion of the signal received on the ~/N wire pair with a second portion of the signal received on the N/G wire pair.

Figure 4F:
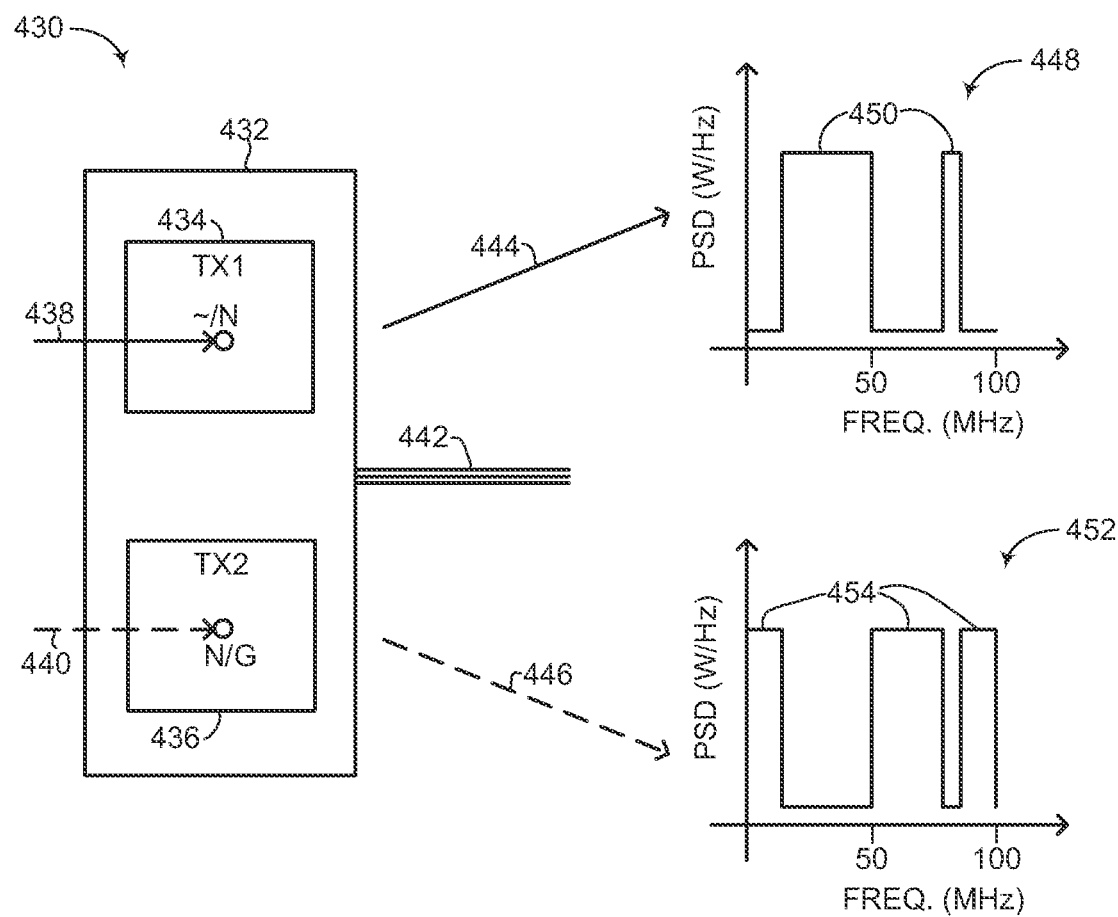
FIG. 4F is a schematic illustration of a switched MRC PLC per carrier network between two nodes, constructed and operative in accordance with another embodiment of the disclosed technique.

Reference is now made to FIG. 4F, which is a schematic illustration of a switched MRC PLC per carrier network between two nodes, generally referenced 430, constructed and operative in accordance with another embodiment of the disclosed technique. Switched MRC PLC per carrier network 430 includes a transmitter section 432, which includes a first transmitter 434, shown as TX1 in the figure, and a second transmitter 436, shown as TX2 in the figure. Transmitter section 432 is coupled with a receiver (not shown) via an electrical cable 442. The receiver section is embodied as an MRC receiver and could be either RX 404 (FIG. 4D) or RX 374 (FIG. 4E). TX1 434 is wired to transmit an analog signal 438 over the ~/N wire pair and TX2 is wired to transmit an analog signal 440 over the N/G wire pair. In digital communication, signals are transmitted by modulating them over different frequencies, or frequency ranges. The electromagnetic wave over which a signal is modulated over is referred to as a carrier wave. In the embodiment of FIG. 4F, two separate disjoint carrier wave ranges are defined, as shown via an arrow 444 and an arrow 446. A graph 448 shows the power spectral density (herein abbreviated PSD), in units of Watts per Hertz (herein abbreviated W/Hz), as a function of the frequency, as measured in MHz, of a first set of carrier waves. The PSD substantially refers to the power carried by a carrier wave, per unit of frequency. As shown in graph 448, a subset of the frequency range shown in the graph has a substantial PSD, shown as steps 450. A graph 452 shows the PSD, in units of W/Hz, as a function of the frequency, as measured in MHz of a second set of carrier waves. As shown in graph 452, another subset of the frequency range shown in the graph has a substantial PSD, shown as steps 454. The first set of carrier waves in graph 448 and the second set of carrier waves in graph 452 are disjoint, meaning they represent mutually exclusive groups.

In the embodiment shown in FIG. 4F, a processor (not shown) coupled with transmitter section 432, determines for each signal to be transferred over electrical cable 442 the frequency of the carrier wave to be used. If the frequency of the carrier wave to be used for a given signal is in the range of the first set of carrier waves, as shown in graph 448, then the processor provides the signal to TX1 434, which transmits the signal over the ~/N wire pair. If the frequency of the carrier wave to be used for a given signal is in the range of the second set of carrier waves, as shown in graph 452, then the processor provides the signal to TX2 436, which transmits the signal over the N/G wire pair. In general, the embodiment of FIG. 4F enables different carrier wave frequency ranges to be defined for each wire pair used to transmit signals. This embodiment can be used when one wire pair may exhibit better transmission characteristics in a first frequency range and another wire pair may exhibit better transmission characteristics in a second frequency range. Transmission characteristics can include the noise level on a wire pair. In this respect, transmitter section 432 can transmit signals using two different channels as the term is used in radio and wireless communications, with one channel being the frequency range shown in graph 448 and another channel being the frequency range shown in graph 452. A processor (not shown) determines what the frequency ranges are of each channel. As mentioned above, the choice of channel used, i.e., which carrier wave to transmit a signal on, is determined by the processor per signal to be transmitted. For example, a first signal may be transferred as analog signal 438, a second signal may also be transferred as analog signal 438 and then a third signal may be transferred as analog signal 440.

In general, the choice of which embodiment, as shown above in FIGS. 4A-4F, to use for a PLC network depends on many factors, including the topology of electrical sockets in a residence, the electrical devices plugged into those electrical sockets, the type of electrical distribution used in the residence, the physical distance between nodes and the amount of interference, such as RF ingress, in the vicinity of the electrical cables of the residence. It is noted that the protocol used for the PLC network, as well as the permitted levels of power output as a function of the frequency of the carrier wave used can also determine which embodiment is to be selected. For example, the G.HN protocol for PLC networks uses a bandwidth of 100 MHz for transmitting data over electrical cables, yet the permitted level of power output is significantly lower in the higher frequency range of the defined bandwidth (e.g., the range of 0-30 MHz may permit a high level of power output whereas the range of 30-100 MHz may permit a low level of power output). Depending on the factors listed above, a particular residence may achieve better transmission characteristics by using the entire bandwidth, e.g. 0-100 MHz (one transmission channel regarding the bandwidth), as shown above in any of the embodiments of FIGS. 4A-4E. Likewise, another particular residence may achieve better transmission characteristics by using separate portions of the bandwidth, as shown above in the embodiment of FIG. 4F (two transmission channels regarding the bandwidth). It is noted that typical PLC communication systems use orthogonal frequency-division multiplexing (herein abbreviated OFDM) modulation for transmitting data over carrier waves over electrical cables. In OFDM modulation, the bandwidth of the system is divided up into a large number of carriers, or subcarriers. In such a configuration, fluctuations in channel attenuation (regarding the bandwidth) as well as additive noise over the frequency range of the bandwidth may be substantially large. Using the disclosed technique, such as the embodiment of FIG. 4F, enables the processor (not shown) to which transmitter section 432 is coupled with, to determine and select the best one of the two channels for transmitting signals for each individual subcarrier or for a group of consecutive subcarriers.

As mentioned above, in the switch embodiments of the disclosed technique (as shown in FIGS. 4A, 4B, 4C and 4E) the wire pair chosen by a TX to transmit to an RX, and the wire pair chosen by an RX to receive a signal from a TX, is determined on a node-to-node basis. For example, if a switched PLC network, according to one of the embodiments shown in FIGS. 4A, 4B, 4C and 4E, has three nodes, node A, node B and node C, node A may determine that to transmit data to node B, the N/G wire pair is better, and node C may determine that to transmit data to node B, the N/G wire pair is also better. However, node B may determine that to receive from node A is best on the N/G wire pair, whereas to receive from node C, the ~/N wire pair is better. In the case of the embodiments shown in FIGS. 4A and 4C, where a switch is located on the side of the RX, the RX of the receiving node requires knowledge of which node is transmitting to it before a signal is received so that it knows on which wire pair the received signal should be processed and on which wire pair, the received signal should be discarded. Such knowledge can be provided to the RX by encoding signals transmitted over electrical cables using a time division multiple access (herein abbreviated TDMA) communication method, where a media access control (herein abbreviated MAC) frame signal, such as a media access plan signal, is transmitted to an RX before the signal including the data is transmitted. The MAC frame signal substantially includes a plan of the information relating to the signal (which includes data) to be transmitted in the upcoming time intervals, which includes from which node the signal is going to come from. In this respect, the RX of the receiving node will know from which node the signal is coming from and can appropriately select the wire pair over which signals received will be provided for further processing, according to what was decided between the two nodes. In the case of the embodiment in FIG. 4B, where the RX of the receiving node is wired to a specific wire pair, and in the case of FIGS. 4D, 4E and 4F, where an MRC technique is used and data received on two of the wire pairs is provided for further processing, a TDMA communication method does not need to be used to encode signals transmitted over electrical cables. It should also be noted that MAC schemes exists in which the identity of the transmitter is not provided in the MAC frame signal. In such a case, if a switch is used on the TX side of a node, such as in the embodiments shown in FIGS. 4A, 4B and 4E, all the nodes on a network can jointly decide on which wire pair to transmit. Unlike other embodiments described above, where the choice of wire pair to transmit and receive is on a node-to-node basis, the decision to transmit over a particular wire pair in this embodiment is for the TX side of all nodes on the network, i.e., a decision on a network basis.

Reference is now made to FIG. 5, which is a schematic illustration of a modem of the prior art, generally referenced 470. Modem 470 includes a casing 472, a processor 474, an analog to digital converter 476 (herein abbreviated ADC), a digital to analog converter 478 (herein abbreviated DAC), a receiver 480, a transmitter 482 and a power cable 484. ADC 476 is coupled with receiver 480 and processor 474. DAC 478 is coupled with transmitter 482 and processor 474. Receiver 480 and transmitter 482 are electronically coupled with power cable 484. Casing 472 protects and shields processor 474, ADC 476, DAC 478, receiver 480 and transmitter 482. Power cable 484 is a standard power cable that includes three wires, a live wire, a neutral wire and a ground wire and enables modem 470 to be plugged into an electrical socket (not shown). Modem 470 is coupled with an electrical device (not shown), such as a computer, printer, television and the like. Modem 470 enables data signals to be transmitted, as shown by an arrow 486B, as well as received, as shown by an arrow 486A, via electrical cables.

When data is received, an analog electrical signal sent via electrical cables (not shown) is received by receiver 480 via power cable 484. In modem 470, the data is received on the ~/N wire pair. The receiver provides the analog electrical signal to ADC 476, which converts the analog electrical signal to a digital electrical signal, which is then provided to processor 474. Processor 474 then decodes the digital electrical signal, modifies the digital electrical signal, passes the digital electrical signal to the electrical device it is attached to, and the like. When the electrical device to which modem 470 is coupled with wants to send a signal via PLC, the signal is provided to processor 474. Processor 474 may code, modify and/or process the signal, which is then provided to DAC 478. DAC 478 converts the digital electrical signal to an analog electrical signal and provides it to transmitter 482, which transmits the signal over the ~/N wire pair of power cable 484.

Reference is now made to FIGS. 6A-6F, which represent various embodiments of the TXs and RXs shown in FIGS. 4A-4F. As will be shown below, the switch, on either the TX side or the RX side of a node in a network can be embodied at the level of an analog front end (herein abbreviated AFE) or at the level of a processor. At the level of the AFE, a physical switch is required to be added to state of the art PLC modems constructed and operative according to the disclosed technique. At the level of the processor, also known as the chip level, no new elements are required to be added to state of the art PLC modems, rather the processor in such PLC modems needs to be reprogrammed. This is explained below.

Figure 6C:
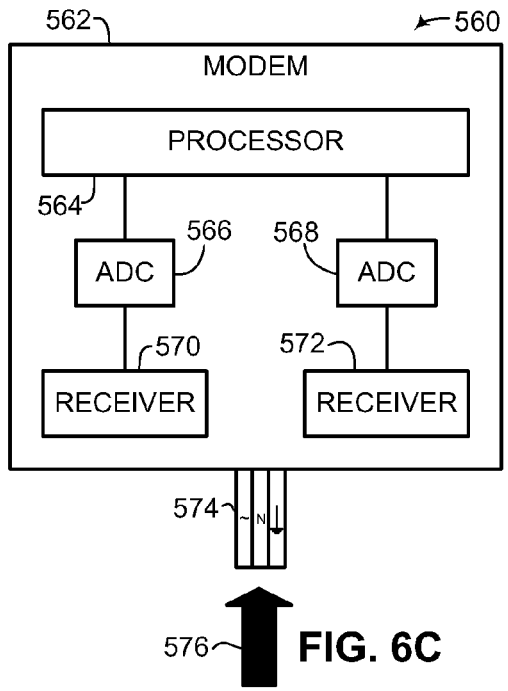
FIG. 6C is a schematic illustration of a further receiver section of a switched PLC modem, constructed and operative in accordance with a further embodiment of the disclosed technique.

Reference is now made to FIG. 6A, which is a schematic illustration of a receiver section of a switched PLC modem, generally referenced 500, constructed and operative in accordance with a further embodiment of the disclosed technique. For purposes of clarity and simplicity, FIG. 6A only shows the receiver section of switched PLC modem 500, as is the case in FIGS. 6B and 6C. Switched PLC modem 500 also includes a transmitter section (not shown). The transmitter section can be one of the transmitter sections described below in FIGS. 6D, 6E and 6F or a transmitter section as is known in the prior art. Switched PLC modem 500 includes a casing 502, a processor 504, an ADC 506, a receiver 508, a switch 510 and a power cable 512. ADC 506 is coupled with receiver 508 and processor 504. Switch 510 is coupled with receiver 508, processor 504 and power cable 512. Casing 502 protects and shields processor 504, ADC 506, receiver 508 and switch 510. Power cable 512 is a standard power cable that includes three wires, a live wire, a neutral wire and a ground wire and enables switched PLC modem 500 to be plugged into an electrical socket (not shown). Switched PLC Modem 500 is coupled with an electrical device (not shown), such as a computer, printer, television and the like. Since FIG. 6A only shows the receiver section of switched PLC modem 500, it can only receive data signals, as shown by an arrow 514, via electrical cables.

FIG. 6A represents one embodiment of RX 284 (FIG. 4A) and RX 344 (FIG. 4C). Switch 510 enables receiver 508 to be coupled to one of the three wire pairs in power cable 512. In this embodiment, processor 504 determines, based on verification of the transmission characteristics and quality of each wire pair, which wire pair receiver 508 should be coupled with in power cable 512 via switch 510. When a signal is received on a particular wire pair, receiver 508 provides the signal to ADC 506 which converts the analog signal to a digital signal, which is then provided to processor 504 for processing.

Reference is now made to FIG. 6B, which is a schematic illustration of another receiver section of a switched PLC modem, generally referenced 530, constructed and operative in accordance with another embodiment of the disclosed technique. For purposes of clarity and simplicity, FIG. 6B only shows the receiver section of switched PLC modem 530. Switched PLC modem 530 also includes a transmitter section (not shown). The transmitter section can be one of the transmitter sections described below in FIGS. 6D, 6E and 6F, or a transmitter section as is known in the prior art. Switched PLC modem 530 includes a casing 532, a processor 534, an ADC 536, a switch 538, a first receiver 540, a second receiver 542 and a power cable 544. ADC 536 is coupled with switch 538 and processor 534. Switch 538 is coupled with first receiver 540, second receiver 542 and processor 504. First receiver 540 is coupled with a wire pair in power cable 544 and second receiver 542 is coupled with a different wire pair in power cable 544. For example, first receiver 540 may be coupled with the ~/N wire pair and second receiver 542 may be coupled with the N/G wire pair. Casing 532 protects and shields processor 534, ADC 536, first receiver 540, second receiver 542 and switch 538. Power cable 544 is a standard power cable that includes three wires, a live wire, a neutral wire and a ground wire and enables switched PLC modem 530 to be plugged into an electrical socket (not shown). Switched PLC Modem 530 is coupled with an electrical device (not shown), such as a computer, printer, television and the like. Since FIG. 6B only shows the receiver section of switched PLC modem 530, it can only receive data signals, as shown by an arrow 546, via electrical cables.

FIG. 6B represents another embodiment of RX 284 (FIG. 4A) and RX 344 (FIG. 4C). Each of first receiver 540 and second receiver 542 receives signals from a transmitter (not shown) on both the direct communication channel as well as the crosstalk communication channel. Whereas both receivers receive signals, only the signals from one receiver is provided to ADC 536 and then to processor 534. If switch 538 is switched to first receiver 540, then only the signals received by first receiver 540 are provided to ADC 536. If switch 538 is switched to second receiver 542, then only the signals received by second receiver 542 are provided to ADC 536. In this embodiment, processor 534 determines, based on verification of the transmission characteristics and quality of each wire pair, which receiver switch 538 should be switched to.

Reference is now made to FIG. 6C, which is a schematic illustration of a further receiver section of a switched PLC modem, generally referenced 560, constructed and operative in accordance with a further embodiment of the disclosed technique. For purposes of clarity and simplicity, FIG. 6C only shows the receiver section of switched PLC modem 560. Switched PLC modem 560 also includes a transmitter section (not shown). The transmitter section can be one of the transmitter sections described below in FIGS. 6D, 6E and 6F, or a transmitter section as is known in the prior art. Switched PLC modem 560 includes a casing 562, a processor 564, a first ADC 566, a second ADC 568, a first receiver 570, a second receiver 572 and a power cable 574. First ADC 566 is coupled with first receiver 570 and processor 564. Second ADC 568 is coupled with second receiver 572 and processor 564. First receiver 570 is coupled with a wire pair in power cable 574 and second receiver 572 is coupled with a different wire pair in power cable 574. For example, first receiver 570 may be coupled with the ~/G wire pair and second receiver 572 may be coupled with the ~/N wire pair. Casing 562 protects and shields processor 564, first ADC 566, second ADC 568, first receiver 570 and second receiver 572. Power cable 574 is a standard power cable that includes three wires, a live wire, a neutral wire and a ground wire and enables switched PLC modem 560 to be plugged into an electrical socket (not shown). Switched PLC Modem 560 is coupled with an electrical device (not shown), such as a computer, printer, television and the like. Since FIG. 6C only shows the receiver section of switched PLC modem 560, it can only receive data signals, as shown by an arrow 576, via electrical cables.

FIG. 6C represents another embodiment of RX 284 (FIG. 4A) and RX 344 (FIG. 4C) as well as possible embodiments of RX 404 (FIG. 4D) and RX 374 (FIG. 4E). Recall that RX 404 and RX 374 refer to MRC receivers. In switched PLC modem 560, switching is executed in processor 564. Each of first receiver 570 and second receiver 572 receives signals from a transmitter (not shown) on both the direct communication channel as well as the crosstalk communication channel. Receivers receive signals and provide those signals to respective ADCs, which convert the analog signals to digital signals. Both respective digital signals are provided to processor 564. Processor 564 decides which of the digital signals received to demodulate, based on verification of the transmission characteristics and quality of the wire pairs that first receiver 570 and second receiver 572 are coupled with.

It is noted that in an alternative to FIG. 6C, a switch (not shown) may be included in switched PLC modem 560, between processor 564 and first ADC 566 and second ADC 568. In such an embodiment, the digital signals from first ADC 566 and second ADC 568 would be provided to the switch, which would be coupled with, and controlled by processor 564. Depending on the position of the switch, only one digital signal would be provided to processor 564 for processing.

Figure 6D:
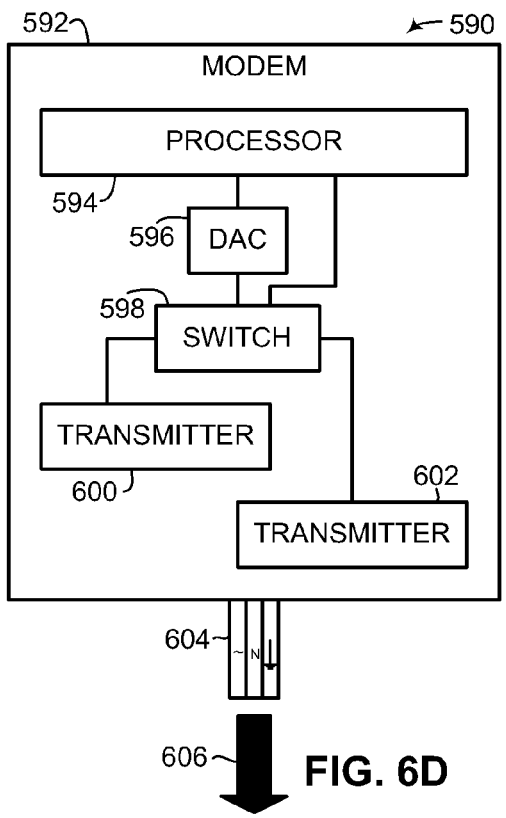
FIG. 6D is a schematic illustration of a transmitter section of a switched PLC modem, constructed and operative in accordance with another embodiment of the disclosed technique.

Reference is now made to FIG. 6D, which is a schematic illustration of a transmitter section of a switched PLC modem, generally referenced 590, constructed and operative in accordance with another embodiment of the disclosed technique. For purposes of clarity and simplicity, FIG. 6D only shows the transmitter section of switched PLC modem 590, as is the case in FIGS. 6E and 6F. Switched PLC modem 590 also includes a receiver section (not shown). The receiver section can be one of the receiver sections described above in FIGS. 6A, 6B and 6C, or a receiver section as is known in the prior art. Switched PLC modem 590 includes a casing 592, a processor 594, a DAC 596, a switch 598, a first transmitter 600, a second transmitter 602 and a power cable 604. DAC 596 is coupled with switch 598 and processor 594. Switch 598 is coupled with first transmitter 600, second transmitter 602 and processor 594. First transmitter 600 is coupled with a wire pair in power cable 604 and second transmitter 602 is coupled with a different wire pair in power cable 604. For example, first transmitter 600 may be coupled with the ~/G wire pair and second transmitter 602 may be coupled with the N/G wire pair. Casing 592 protects and shields processor 594, DAC 596, first transmitter 600, second transmitter 602 and switch 598. Power cable 604 is a standard power cable that includes three wires, a live wire, a neutral wire and a ground wire and enables switched PLC modem 590 to be plugged into an electrical socket (not shown). Switched PLC Modem 590 is coupled with an electrical device (not shown), such as a computer, printer, television and the like. Since FIG. 6D only shows the transmitter section of switched PLC modem 590, it can only transmit data signals, as shown by an arrow 606, via electrical cables.

FIG. 6D represents an embodiment of TX 282 (FIG. 4A), TX 312 (FIG. 4B) and TX 372 (FIG. 4E). Each of first transmitter 600 and second transmitter 602 transmits signals to a receiver (not shown) on both the direct communication channel as well as the crosstalk communication channel. Whereas both transmitters can transmit signals, only one transmitter transmits the signal provided to it by DAC 596, from processor 594. If switch 598 is switched to first transmitter 600, then DAC 596 only provides signals for transmission to first transmitter 600. If switch 598 is switched to second transmitter 602, then DAC 596 only provides signals for transmission to second transmitter 602. In this embodiment, processor 594 determines, based on verification of the transmission characteristics and quality of each wire pair, which transmitter switch 598 should be switched to. In another embodiment of FIG. 6D, the processor (not shown) in the receiver (not shown) determines which wire pair switched PLC modem 590 should transmit over. In this embodiment, the receiver provides a signal to processor 594, instructing it to shift switch 598 to a particular transmitter.

Figure 6E:
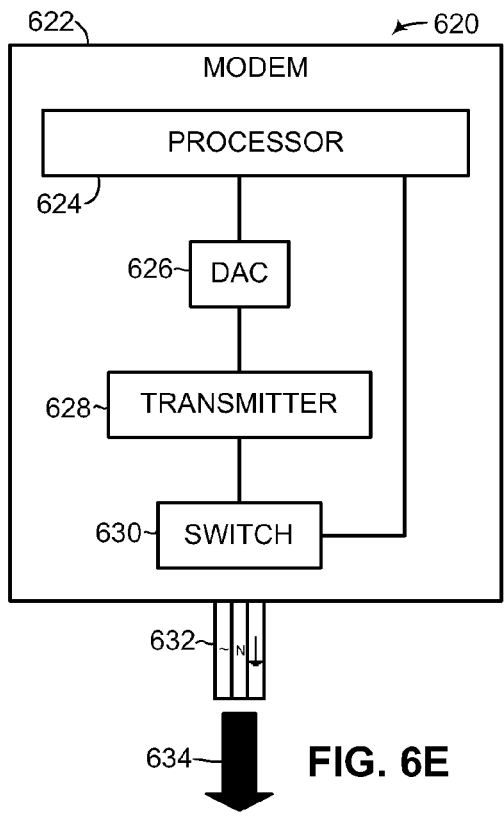
FIG. 6E is a schematic illustration of another transmitter section of a switched PLC modem, constructed and operative in accordance with a further embodiment of the disclosed technique.

Reference is now made to FIG. 6E, which is a schematic illustration of another transmitter section of a switched PLC modem, generally referenced 620, constructed and operative in accordance with a further embodiment of the disclosed technique. For purposes of clarity and simplicity, FIG. 6E only shows the transmitter section of switched PLC modem 620. Switched PLC modem 620 also includes a receiver section (not shown). The receiver section can be one of the receiver sections described above in FIGS. 6A, 6B and 6C or a receiver section as is known in the prior art. Switched PLC modem 620 includes a casing 622, a processor 624, a DAC 626, a transmitter 628, a switch 630 and a power cable 632. DAC 626 is coupled with transmitter 628 and processor 624. Switch 630 is coupled with transmitter 628, processor 624 and power cable 632. Casing 622 protects and shields processor 624, DAC 626, transmitter 628 and switch 630. Power cable 632 is a standard power cable that includes three wires, a live wire, a neutral wire and a ground wire and enables switched PLC modem 620 to be plugged into an electrical socket (not shown). Switched PLC Modem 620 is coupled with an electrical device (not shown), such as a computer, printer, television and the like. Since FIG. 6E only shows the transmitter section of switched PLC modem 620, it can only transmit data signals, as shown by an arrow 634, via electrical cables.

FIG. 6E represents another embodiment of TX 282 (FIG. 4A), TX 312 (FIG. 4B) and TX 372 (FIG. 4E). Switch 630 enables transmitter 628 to be coupled to one of the three wire pairs in power cable 632. In this embodiment, processor 624 determines, based on verification of the transmission characteristics and quality of each wire pair, which wire pair transmitter 628 should be coupled with in power cable 632 via switch 630. When a signal is to be transmitted, processor 624 provides the signal to DAC 626 which converts the digital signal to an analog signal and provides the analog signal to transmitter 628. Depending on which wire pair switch 630 is switched to, transmitter 628 will transmit the analog signal along that wire pair. In another embodiment of FIG. 6E, the processor (not shown) in the receiver (not shown) determines which wire pair switched PLC modem 620 should transmit over. In this embodiment, the receiver provides a signal to processor 624, instructing it to shift switch 630 to a particular wire pair.

Figure 6F:
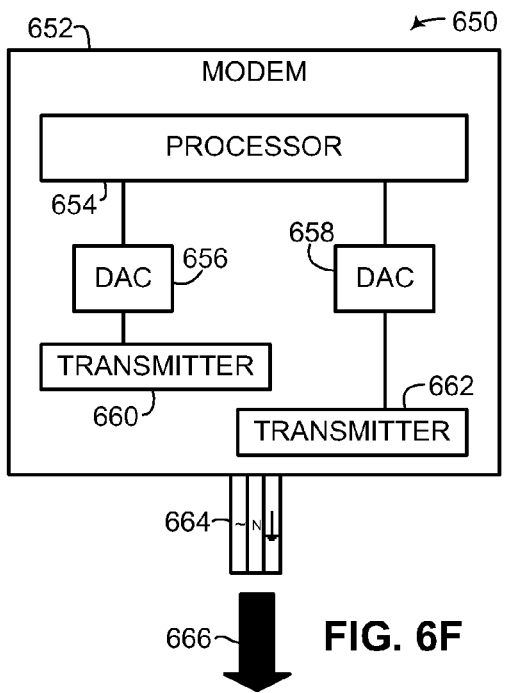
FIG. 6F is a schematic illustration of a further transmitter section of a switched PLC modem, constructed and operative in accordance with another embodiment of the disclosed technique.

Reference is now made to FIG. 6F, which is a schematic illustration of a further transmitter section of a switched PLC modem, generally referenced 650, constructed and operative in accordance with another embodiment of the disclosed technique. For purposes of clarity and simplicity, FIG. 6F only shows the transmitter section of switched PLC modem 650. Switched PLC modem 650 also includes a receiver section (not shown). The receiver section can be one of the receiver sections described above in FIGS. 6A, 6B and 6C, or a receiver section as is known in the prior art. Switched PLC modem 650 includes a casing 652, a processor 654, a first DAC 656, a second DAC 658, a first transmitter 660, a second transmitter 662 and a power cable 664. First DAC 656 is coupled with first transmitter 660 and processor 654. Second DAC 658 is coupled with second transmitter 662 and processor 654. First transmitter 660 is coupled with a wire pair in power cable 664 and second transmitter 662 is coupled with a different wire pair in power cable 664. For example, first transmitter 660 may be coupled with the ~/N wire pair and second transmitter 662 may be coupled with the ~/G wire pair. Casing 652 protects and shields processor 654, first DAC 656, second DAC 658, first transmitter 660 and second transmitter 662. Power cable 664 is a standard power cable that includes three wires, a live wire, a neutral wire and a ground wire and enables switched PLC modem 650 to be plugged into an electrical socket (not shown). Switched PLC Modem 650 is coupled with an electrical device (not shown), such as a computer, printer, television and the like. Since FIG. 6F only shows the transmitter section of switched PLC modem 650, it can only transmit data signals, as shown by an arrow 666, via electrical cables.

FIG. 6F represents another embodiment of TX 282 (FIG. 4A), TX 312 (FIG. 4B) and TX 372 (FIG. 4E) as well as a possible embodiment of transmitter section 432 (FIG. 4F). Recall that transmitter section 432 refers to a per carrier PLC configuration with two transmitters. In switched PLC modem 650, switching is executed in processor 654. Each of first transmitter 660 and second transmitter 662 transmits signals to a receiver (not shown) on both the direct communication channel as well as the crosstalk communication channel. Processor 654 decides which DAC signals are to be provided to for transmission, based on verification of the transmission characteristics and quality of the wire pairs that first transmitter 660 and second transmitter 662 are coupled with. It is also noted, that in an embodiment where FIG. 6F is used to enable a PLC modem with per carrier capabilities, processor 654 determines per carrier to be transmitted, which transmitter is to be used for transmitting the subcarrier. Each of first transmitter 660 and second transmitter 662 is assigned a particular carrier subset (i.e., frequency range) over which it transmits signals. Depending on the carrier used for a given signal, processor 654 either provides the signal to DAC 656 or DAC 658. For example, if first transmitter 660 transmits carrier waves in the range of 0-50 MHz and if second transmitter 662 transmits carrier waves in the range of 50-100 MHz, then if processor 654 determines that a particular signal will be transmitter using a carrier wave of 56 MHz, the digital signal will be provided to DAC 658 which will convert the digital signal to an analog signal and provide it to second transmitter 662. Second transmitter 662 will transmit the signal over the wire pair to which it is coupled with.

It is noted that in an alternative to FIG. 6F, a switch (not shown) may be included in switched PLC modem 650, between processor 654 and first DAC 656 and second DAC 658. In such an embodiment, the digital signals from processor 654 would be provided to the switch, which would then provide the digital signal to either first DAC 656 or second DAC 658, depending on which wire pair the signal is to be transmitted over or depending on the frequency of the carrier wave on which the signal is to be transmitted over. The switch would be controlled by processor 654 and at any given time interval, only one digital signal would be converted to an analog signal to be transmitted by one of the transmitters.

As mentioned above, it is noted that a PLC modem includes a receiver section and a transmitter section. Accordingly, a PLC modem according to the disclosed technique can be constructed using any of the embodiments of the receiver section shown above in FIGS. 6A-6C with any of the embodiments of the transmitter section shown above in FIGS. 6D-6F.

Also, a PLC modem according to the disclosed technique can be constructed using any of the embodiments of the receiver section, as shown in FIGS. 6A-6C, with a prior art transmitter section, and a PLC modem according to the disclosed technique can further be constructed using any of the embodiments of the transmitter section, as shown in FIGS. 6D-6F, with a prior art receiver section.

In switched PLC networks, TXs and RXs may change the communication channel (for example, ~/N or N/G) over which they respectively transmit and receive signals depending on various factors such as noise level and quality of a given communication channel, either direct or crosstalk. Such factors may be determined at predetermined time intervals. In order for a TX or an RX to physically switch the communication channel, the TX or RX may need to temporarily disconnect from the network, or from the transmission or receiving of signals. If the switching of the communication channel is not coordinated between a given TX and RX pair which communicate with one another, then signals may not be transmitted or received properly. In addition, signals may not be transmitted and received over the communication channel having the lowest level of noise, the highest quality or other relevant factors such as the communication channel over which an RX receives most of its traffic. According to the disclosed technique, a signal is provided in a preamble frame to a signal transmission frame, such as a data packet, indicating over which communication channel the upcoming signal transmission frame will be transmitted over. As such, RXs in a network can switch to the designated communication channel in a synchronized manner with the transmission of the upcoming signal transmission frame. Various methods are provided below in FIGS. 7A-7E for coordinating the selection and changing of a communication channel between a given TX and RX pair such that signals are transmitted and received properly over the communication channel. The selection of a given communication channel can depend on a plurality of factors, such as the communication channel with the lowest level of noise, the communication channel having the highest quality, the selection carried out for other TX and RX pairs in the network linked with the same RX or TX and the like. It is noted that according to the disclosed technique, the RX substantially selects the best communication channel based on a plurality of factors, such as the example factors listed just above. The criteria for best communication channel are a matter of design choice and can vary depending on the size of the network, network topology, network traffic and the like. Based on the methods and schemes described below in FIGS. 7A-7E, it is noted that other embodiments for coordinating the selection and changing of a communication channel are possible and obvious to a worker skilled in the art.

Figure 7A:
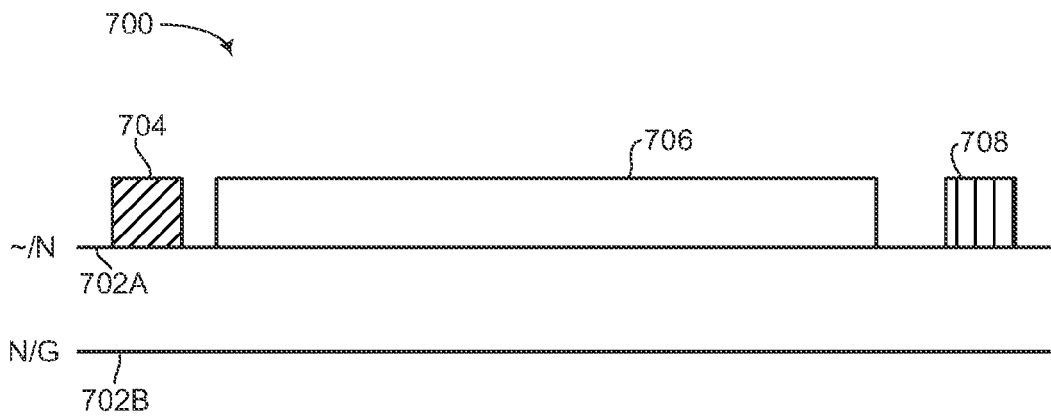
FIG. 7A is a schematic illustration of a first communication channel coordination scheme in a switched PLC network between two nodes, constructed and operative in accordance with a further embodiment of the disclosed technique.

Reference is now made to FIG. 7A, which is a schematic illustration of a first communication channel coordination scheme in a switched PLC network between two nodes, generally referenced 700, constructed and operative in accordance with a further embodiment of the disclosed technique. In FIG. 7A, signals are transferred between a TX (not shown) and an RX (not shown). First communication channel coordination scheme 700 includes two communication channels, an ~/N communication channel 702A and an N/G communication channel 702B. A third communication channel (not shown) which would be over the ~/G wire pair is present in first communication channel coordination scheme 700 but is not shown for purposes of clarity. As mentioned above, the selected wire pairs shown in FIGS. 7A-7D are brought merely as an example. In first communication channel coordination scheme 700, one of the communication channels is pre-selected as a default communication channel. In FIG. 7A, ~/N communication channel 702A is pre-selected as the default communication channel. Therefore, any node joining the switched PLC network shown in FIG. 7A would first listen to communications on the default communication channel in an attempt to join the network and determine when it can transmit or receive signals over the network.

First communication channel coordination scheme 700 includes a directive frame 704, a signal transmission frame 706 and a selective acknowledgement (herein abbreviated SACK) frame 708. Directive frame 704 is a standard frame transmitted before a signal or a signal burst, such as signal transmission frame 706, is transmitted between the TX and the RX. Directive frame 704 substantially indicates which communication channel (or wire pair) the next signal or signal burst will be transmitted over as well as other data such as how long the transmission will be. Directive frame 704 may be transmitted over the default communication channel. Directive frame 704 may also be transmitted over the other communication channels (or wire pairs) provided that an RX listening to the default communication channel can receive directive frame 704 irrespective of which communication channel directive frame 704 is transmitted over. In this embodiment, the signal carrying directive frame 704 should be a robust signal such that the RX can receive directive frame 704 over any of the communication channels. For example, in FIG. 7A, directive frame 704 indicates that signal transmission frame 706, which is the next signal to be transmitted, will be transmitted over ~/N communication channel 702A (i.e., wire pair ~/N). The RX, or network node which may include an RX, on the network receiving directive frame 704 then knows which communication channel it should listen to for receiving the next transmitted signal such as signal transmission frame 706. In addition, if the network node is not supposed to receive signal transmission frame 706, or if the network node includes a TX (also not shown) and wants to transmit another signal, then directive frame 704 enables the RX in the network node to know when signal transmission frame 706 is over such that the network node does not receive signal transmission frame 706 or the network node which includes a TX can now transmit another signal over the network without risk of signal collision. At the end of each signal transmission frame 706, SACK frame 708 is transmitted. In this embodiment, SACK frame 708 is always transmitted over the default communication channel. Therefore, in one embodiment, if directive frame 704 indicated that the signal transmission frame was to be transmitted over N/G communication channel 702B (not shown), then after switching to the N/G wire pair for transmitting and receiving the signal transmission frame, the TX and the RX would be required to switch back to the default communication channel for transmitting and receiving SACK frame 708. According to another embodiment, the TX and the RX are not required to switch back to the default communication channel for transmitting and receiving SACK frame 708 provided that the RX can receive SACK frame 708 irrespective of which communication channel it was transmitted over. In this embodiment, the signal carrying SACK frame 708 should be a robust signal such that it can be received over any of the communication channels. As directive frame 704 is always transmitted over the default communication channel, the TX and the RX are now both ready to transmit and receive another directive frame (not shown) relating to the next signal transmission frame (not shown). In such a manner, the switching of communication channels between the TX and the RX is coordinated.

The embodiment shown in FIG. 7A enables the use of standard frames in transmitted signals for indicating over which communication channel the next signal transmission frame will be transmitted over. Such an embodiment involves a relatively simple change to standard MAC frame signals and is also interoperable between standard devices that can communicate over power lines. It is noted though that directive frame 704 may be substantially long, such as on the order of hundreds of microseconds and that directive frame 704 is also proportionally dependent on the time duration of signal transmission frame 706. Therefore, each signal transmission frame transmitted using first communication channel coordination scheme 700 may exhibit a large overhead regarding time as each signal transmission frame is required to first transmit a directive frame. In addition, any virtual carrier sensing (herein abbreviated VCS) indicated in directive frame 704 may need to cover an entire signal burst, which can lead to an inefficient usage of signal bursting.

Figure 7B:
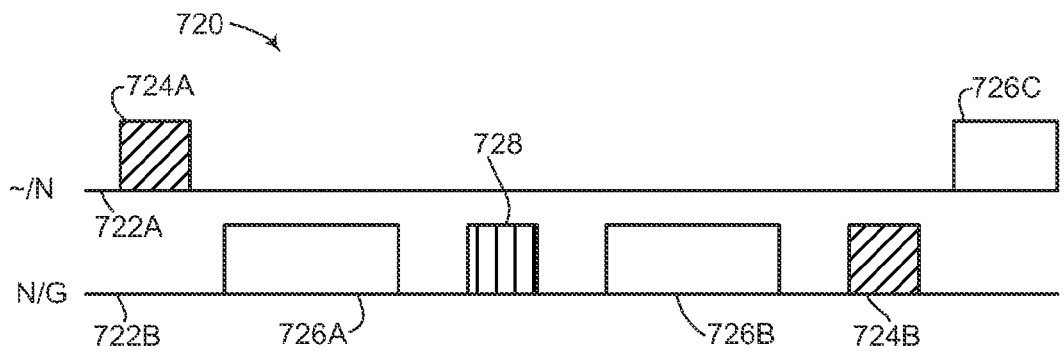
FIG. 7B is a schematic illustration of a second communication channel coordination scheme in a switched PLC network between two nodes, constructed and operative in accordance with another embodiment of the disclosed technique.

Reference is now made to FIG. 7B, which is a schematic illustration of a second communication channel coordination scheme in a switched PLC network between two nodes, generally referenced 720, constructed and operative in accordance with another embodiment of the disclosed technique. In FIG. 7B, signals are transferred between a TX (not shown) and an RX (not shown). Second communication channel coordination scheme 720 includes two communication channels, an ~/N communication channel 722A and an N/G communication channel 722B. A third communication channel (not shown) which would be over the ~/G wire pair is present in second communication channel coordination scheme 720 but is not shown for purposes of clarity. In second communication channel coordination scheme 720, there is no pre-selected default communication channel as in FIG. 7A.

Second communication channel coordination scheme 720 includes a first directive frame 724A, a second directive frame 724B, a first signal transmission frame 726A, a second signal transmission frame 726B, a third signal transmission frame 726C and a SACK frame 728. First and second directive frames 724A and 724B are standard frames similar to directive frame 704 (FIG. 7A) except that first and second directive frames 724A and 724B substantially indicate that another communication channel (or wire pair) is to be used for transmitting and receiving the next signal or signal burst. For example, in FIG. 7B, first directive frame 724A indicates that the next, as well as subsequent signal transmission frames, such as first signal transmission frame 726A and second signal transmission frame 726B, will be transmitted over N/G communication channel 722B (i.e., wire pair N/G). As mentioned above, first directive frame 724A could have indicated that the next signal transmission frame is being transmitted over the ~/G wire pair. The RX receiving first directive frame 724A then knows which communication channel it should switch to for receiving the next and subsequent transmitted signals such as first signal transmission frame 726A and second signal transmission frame 726B. As such, in second communication channel coordination scheme 720, a directive frame is only transmitted when the current communication channel is to be switched. The directive frame then substantially indicates which communication channel is to be the next current communication channel. In this respect, the directive frame is always transmitted over the current communication channel. As shown, SACK frame 728 is transmitted over the current communication channel. First directive frame 724A indicated that subsequent signals would be transmitted over N/G communication channel 722B. As such, N/G communication channel 722B becomes the current communication channel and SACK frame 728 is transmitted over that channel. In this respect, the SACK frame is always transmitted over the current communication channel. In such a manner, the switching of communication channels between the TX and the RX is coordinated.

Second directive frame 724B indicates that the next and subsequent signals, such as third transmission signal frame 726C and further transmission signal frames (not shown), will be transmitted over ~/N communication channel 722A. Transmission signal frames will then be continually transmitted over ~/N communication channel 722A until otherwise indicated by a subsequent directive frame (not shown). Therefore, according to second communication channel coordination scheme 720, a directive frame is only transmitted when the current communication channel (i.e., the wire pair) between the TX and the RX changes. It is noted that second communication channel coordination scheme 720, on average, has a reduced overhead regarding time as opposed to first communication channel coordination scheme 700 (FIG. 7A) and substantially no overhead regarding time in a switched PLC network which includes only two nodes. At the same time it is noted that nodes (i.e., TXs and RXs) in a switched PLC network using second communication channel coordination scheme 720 need to be synchronized and must be aware of what the current communication channel is. For example, nodes in such a network may require some form of memory for knowing what the current communication channel is in the event that a given node loses its synchronization and needs to be resynchronized with the network. It is also noted that the overhead of the directive frame substantially depends on the nature of the signals provided over the network. If traffic on the network is high, nodes on the network may switch communication channels each signal transmission frame, in which case the overheard regarding time in second communication channel coordination scheme 720 would be the same as first communication channel coordination scheme 700.

Figure 7C:
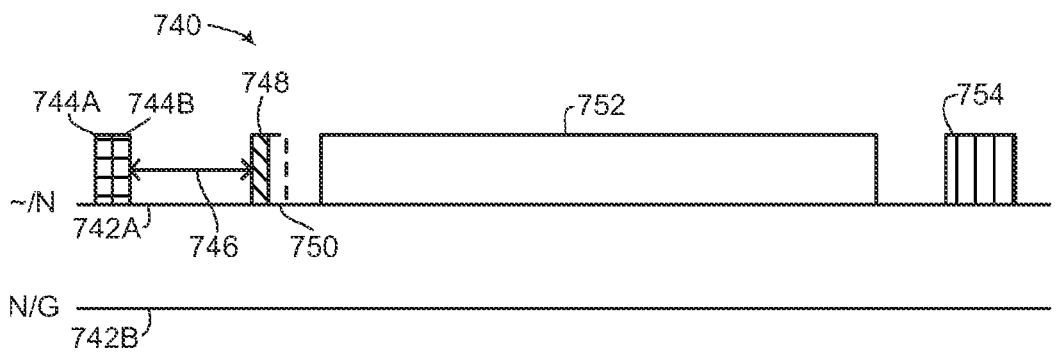
FIG. 7C is a schematic illustration of a third communication channel coordination scheme in a switched PLC network between two nodes, constructed and operative in accordance with a further embodiment of the disclosed technique.

Reference is now made to FIG. 7C, which is a schematic illustration of a third communication channel coordination scheme in a switched PLC network between two nodes, generally referenced 740, constructed and operative in accordance with a further embodiment of the disclosed technique. In FIG. 7C, signals are transferred between a TX (not shown) and an RX (not shown). Third communication channel coordination scheme 740 includes two communication channels, an ~/N communication channel 742A and an N/G communication channel 742B. A third communication channel (not shown) which would be over the ~/G wire pair is present in third communication channel coordination scheme 740 but is not shown for purposes of clarity. In third communication channel coordination scheme 740, as in first communication channel coordination scheme 700 (FIG. 7A), one of the communication channels is pre-selected as a default communication channel. In FIG. 7C, ~/N communication channel 742A is pre-selected as the default communication channel. Therefore, any node joining the switched PLC network shown in FIG. 7C would first listen to communications on the default communication channel in an attempt to join the network and determine when it can transmit or receive signals over the network.

Third communication channel coordination scheme 740 includes a first priority signal 744A, a second priority signal 744B, a contention window 746, a synchronization signal 748, an indication signal 750, a signal transmission frame 752 and a SACK frame 754. First priority signal 744A, second priority signal 744B and contention window 746 are standard signals transmitted before a signal transmission frame is transmitted. First and second priority signals 744A and 744B are merely brought as an example. In a given signal transmission frame, a plurality of priority signals may be first transmitted indicating the priority of various signals to be transmitted by various nodes in the upcoming signal transmission frame. Contention window 746 is a variable length frame in which a draw is conducted amongst all the nodes that want to transmit in the upcoming signal transmission frame which do not have a specified priority. Contention window 746 substantially eliminates collisions on the physical line of the network and is known in the art. After contention window 746, synchronization signal 748 is sent to all nodes in the network. Synchronization signal 748 substantially indicates that the next signal, indication signal 750, will indicate on which communication channel signal transmission frame 752 will be transmitted over. Indication signal 750 may be embodied as a binary signal such that its presence indicates that a first communication channel will be used for transmitting signal transmission frame 752 and its absence indicates that a second communication channel will be used for transmitting signal transmission frame 752. For example, the presence of indication signal 750 may indicate that the next signal will be transmitted over the ~/N wire pair, whereas the absence of indication signal 750 may indicate that the next signal will be transmitted over the N/G wire pair. Since contention window 746 is variable in length, synchronization signal 748 is required to inform all nodes on the network that the next signal (i.e., indication signal 750) is to be verified as an indicator as to which communication channel (i.e., wire pair) the upcoming signal (i.e., signal transmission frame 752) will be transmitted over. In such a manner, the switching of communication channels between the TX and the RX is coordinated.

Synchronization signal 748 and indication signal 750 are non-standard signals. At the same time, since these signals include less data, these signals result in a substantially smaller overheard regarding time as compared with first communication channel coordination scheme 700 (FIG. 7A) and second communication channel coordination scheme 720 (FIG. 7B). It is noted that indication signal 750 can also be embodied as a signal including phase information. The phase information is not necessarily binary and can therefore include an indication of more than two options. Therefore, in this embodiment, indication signal 750 can be used to indicate which of the three possible communication channels (i.e., ~/G, N/G, ~/N) the upcoming signal will be transmitted over. After signal transmission frame 752 is transmitted, SACK frame 754 is transmitted. As in FIG. 7A, first priority signal 744A, second priority signal 744B, contention window 746, synchronization signal 748, indication signal 750 and SACK frame 754 are transmitted over the default communication channel, which in FIG. 7C is ~/N communication channel 742A. Therefore, if indication signal 750 indicates that the next signal transmission frame is to be transmitted over N/G communication channel 742B, then according to one embodiment after the nodes on the network switched to N/G communication channel 742B, all nodes switch back to the default communication channel to receive SACK frame 754 and to listen for the next synchronization signal (not shown) for transmitting and receiving the next the signal transmission frame (not shown). According to another embodiment, the nodes on the network are not required to switch back to the default communication channel for transmitting and receiving SACK frame 754 provided that the nodes can receive SACK frame 754 irrespective of which communication channel it was transmitted over. In this embodiment, the signal carrying SACK frame 754 should be a robust signal such that it can be received over any of the communication channels. Synchronization signal 748 and indication signal 750 are transmitted before each signal transmission frame to indicate to all TXs (not shown) and RXs (not shown) on the network which communication channel will be used next for transmitting. In such a manner, the switching of communication channels between the TXs and the RXs in the network is coordinated.

It is noted that a slight increase in signal collisions may occur in third communication channel coordination scheme 740 since first and second priority signals 744A and 744B may not be seen by all the nodes (not shown) participating in the draw in contention window 746. In addition, in the embodiment shown in FIG. 7C, all RXs (or nodes which are receiving) on the network must switch to another communication channel together, if indicated by indication signal 750, as indication signal 750 only indicates over which communication channel the upcoming signal will be transmitted over and not to whom the upcoming signal is directed to. As synchronization signal 748 and indication signal 750 are not standard signals, third communication channel coordination scheme 740 may require a more complicated change to standard MAC frame signals as opposed to first and second communication channel coordination schemes 700 (FIG. 7A) and 720 (FIG. 7B).

Figure 7D:
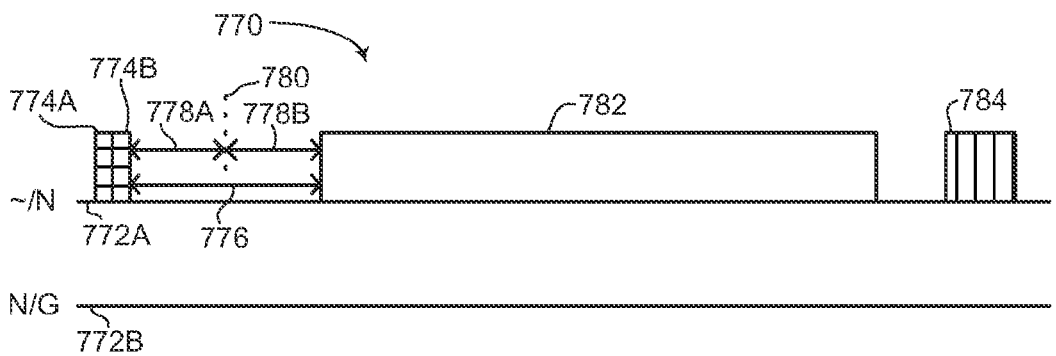
FIG. 7D is a schematic illustration of a fourth communication channel coordination scheme in a switched PLC network between two nodes, constructed and operative in accordance with another embodiment of the disclosed technique.

Reference is now made to FIG. 7D, which is a schematic illustration of a fourth communication channel coordination scheme in a switched PLC network between two nodes, generally referenced 770, constructed and operative in accordance with another embodiment of the disclosed technique. In FIG. 7D, signals are transferred between a TX (not shown) and an RX (not shown). Fourth communication channel coordination scheme 770 includes two communication channels, an ~/N communication channel 772A and an N/G communication channel 772B. A third communication channel (not shown) which would be over the ~/G wire pair is present in fourth communication channel coordination scheme 770 but is not shown for purposes of clarity. In fourth communication channel coordination scheme 770, as in first communication channel coordination scheme 700 (FIG. 7A), one of the communication channels is pre-selected as a default communication channel. In FIG. 7D, ~/N communication channel 772A is pre-selected as the default communication channel. Therefore, any node joining the switched PLC network shown in FIG. 7D would first listen to communications on the default communication channel in an attempt to join the network and determine when it can transmit or receive signals over the network.

Fourth communication channel coordination scheme 770 includes a first priority signal 774A, a second priority signal 774B, a contention window 776, a signal transmission frame 782 and a SACK frame 784. Contention window 776 is divided up into a first communication channel section 778A and a second communication channel section 778B, shown by a dotted line 780. First and second priority signals 774A and 774B are substantially similar to first and second priority signals 744A and 744B (both from FIG. 7C). Contention window 776 is substantially similar to contention window 746 (FIG. 7C) except as noted below. As mentioned above, first and second priority signals 774A and 774B are merely brought as an example, as in a given signal transmission frame, a plurality of priority signals may be first transmitted indicating the priority of various signals to be transmitted by various nodes in the upcoming signal transmission frame.

Contention window 776 is divided up into first communication channel section 778A and second communication channel section 778B. Each communication channel section substantially indicates over which communication channel signals in that section will be transmitted over. Therefore, in first communication channel section 778A, a draw may be conducted between all nodes (not shown) wanting to transmit and receive over ~/N communication channel 772A and in second communication channel section 778B, a draw may be conducted between all nodes (not shown) wanting to transmit and receive over N/G communication channel 772B. Based on the various signals in contention window 776, nodes (not shown) in the network know when to switch communication channels based on the length (i.e., time interval) of first and second communication channel sections 778A and 778B. In such a manner, the switching of communication channels between the TX and the RX is coordinated. In this embodiment, during first communication channel section 778A all nodes listen on ~/N communication channel 772A. Then all nodes switch to N/G communication channel 772B and listen to that communication channel during second communication channel section 778B. After signal transmission frame 782, all nodes then switch back to listening to ~/N communication channel 772A to receive SACK frame 784.

As is obvious to one skilled in the art, contention window 776 may be divided up into a plurality of communication channel sections (not shown) to indicate which of the three wire pairs a given signal will be transmitted over. In addition, as opposed to third communication channel coordination scheme 740 (FIG. 7C), fourth communication channel coordination scheme 770 does not include any non-standard signals. As mentioned above, contention window 776 is a variable length frame in which a draw is conducted amongst all the nodes that want to transmit in the upcoming signal transmission frame which do not have a specified priority. After contention window 776, signal transmission frame 782 is transmitted, followed by SACK frame 784. As in FIG. 7C, first priority signal 774A, second priority signal 774B, contention window 776 and SACK frame 784 are transmitted over the default communication channel, which in FIG. 7D is ~/N communication channel 772A. In the embodiment shown in FIG. 7D, nodes on the network may continuously be switching between ~/N communication channel 772A and N/G communication channel 772B as each contention window 776 may include signals in each communication channel section. Furthermore, since SACK frame 784 and signals sent in first communication channel section 778A are always transmitted over the default communication channel, according to one embodiment, nodes which transmitted over another communication channel must switch back to the default communication channel before the next signal is transmitted. According to another embodiment, nodes which transmitted over another communication channel are not required to switch back to the default communication channel before the next signal is transmitted provided they can receive SACK frame 784, first priority signal 774A, second priority signal 774B and signals sent in contention window 776 irrespective of which communication channel they were transmitted over. In this embodiment, the signals carrying SACK frame 784, first priority signal 774A, second priority signal 774B and signals sent in contention window 776 should be robust signals such that they can be received over any of the communication channels.

As contention window 776 is variable in length and contention window 776 is substantially used to indicate over which communication channel an upcoming transmission will occur, the overhead regarding time in FIG. 7D may be substantially smaller than the embodiments shown in FIGS. 7A and 7B. At the same time though, the overheard regarding time shown in FIG. 7D is scenario dependent and is proportional to the length (i.e., the time interval) of contention window 776. It is noted that a reduction in the size of contention window 776 may result in an increase in signal collisions in the network and as such contention window 776 may need to be substantially large to enable an efficient use of contention window 776 for eliminating or substantially reducing signal collisions in the network. As mentioned above, in this embodiment all RXs in the network must switch to the communication channel designated by second communication channel section 778B at the same point in time in contention window 776, as indicated by dotted line 780.

Figure 7E:
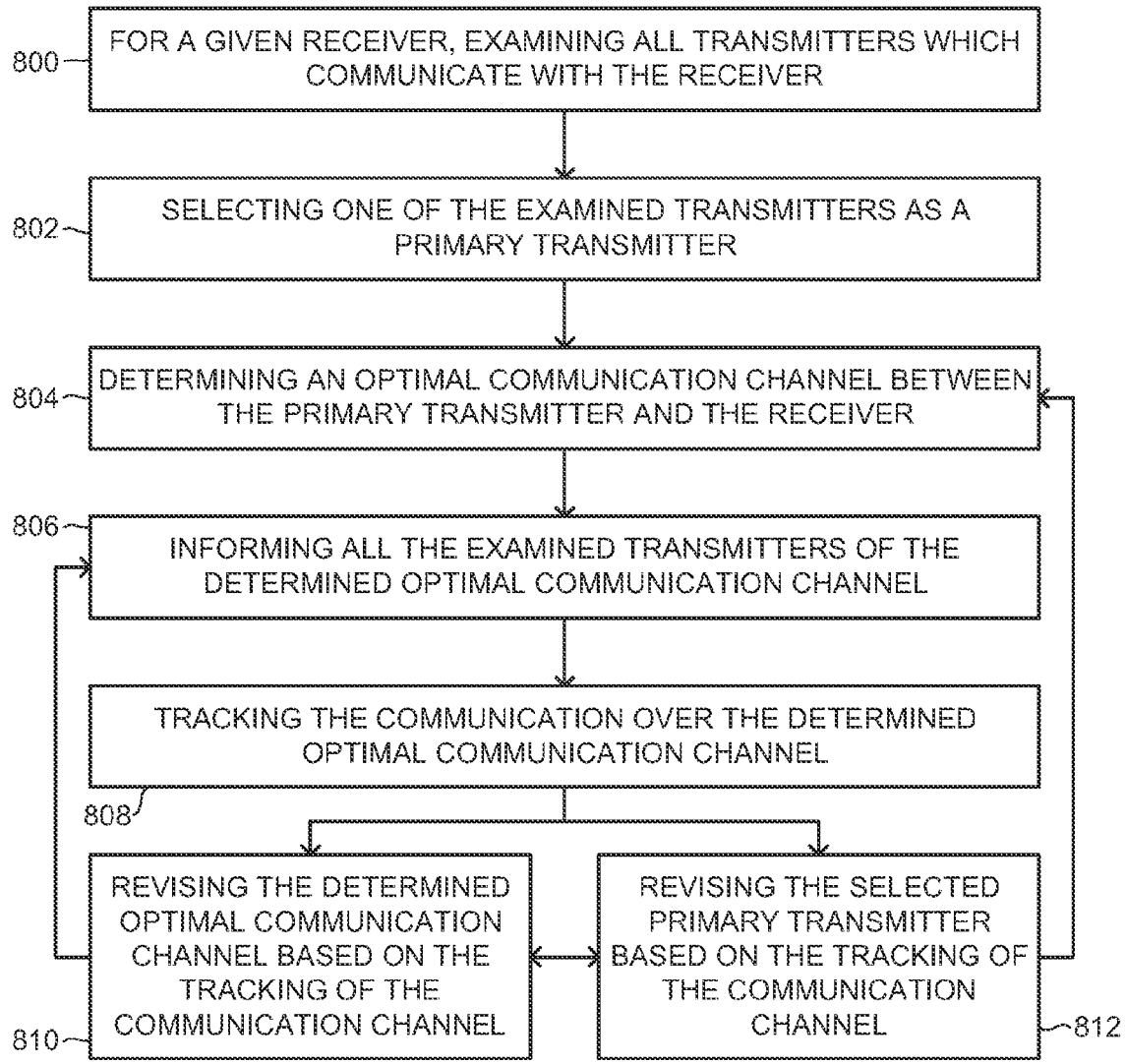
FIG. 7E is a schematic illustration of a communication channel coordination method in a switched PLC network between a plurality of nodes, constructed and operative in accordance with a further embodiment of the disclosed technique.

Reference is now made to FIG. 7E, which is a schematic illustration of a communication channel coordination method in a switched PLC network between a plurality of nodes, constructed and operative in accordance with a further embodiment of the disclosed technique. The method of FIG. 7E represents a fifth communication channel coordination scheme in a switched PLC network between a plurality of nodes. In a procedure 800, each RX in a switched PLC network examines the TXs it communicates with. For example, some RXs may communicate with only one TX whereas other RXs may communicate with a plurality of TXs or possibly all TXs in a switched PLC network. In a procedure 802, based on a plurality of factors, such as the amount of traffic a given RX receives from each TX in the network it communicates with, each RX selects one of the TX's it communicates with as a primary TX. In a procedure 804, each RX then determines an optimal communication channel between itself and the primary TX. The determined communication channel can be based on a number of factors, such as the communication channel with the lowest level of noise, the communication channel with the highest quality, and the like. In this procedure, the factors taken into account to determine the optimal communication channel relate specifically to the primary TX. In a procedure 806, the given RX then informs all the TXs it communicates with of the determined communication channel. The RX then uses that communication channel to receive signals on permanently, be it from the primary TX or any other TX it communicates with. It is noted that in this procedure, the determined communication channel is the communication channel over which the RX receives signals yet not necessarily the communication channel over which TXs which communicate with the given RX may transmit signals over. For example, a TX may switch communication channels over which it transmits each time it transmits a new signal whereas the RXs it communicates with will only receive on their respective determined communication channels.

In a procedure 808, the RX tracks the communication of signals over the determined communication channel between itself and all the TXs in the switched PLC network it communicates with. Tracking can involve tracking the quality of the signals received, the number of collisions experienced in receiving signals, as well as other criteria such as the throughput (i.e. the PHY rate), the error rate, the false alarm rate and the like. In a procedure 810, based on the tracked communication between the RX and each of the TXs it communicates with, the RX can revise the determined optimal communication channel and determine another optimal communication channel between itself, the primary TX and all the other TXs it communicates with in the network. After procedure 810, the method proceeds back to procedure 806, thereby updating the revised determined optimal communication channel to all the TXs, including the primary TX, the RX communicates with in the network. In a procedure 812, based on the tracked communication between the RX and each of the TXs it communicates with, the RX can revise the selected primary TX and select another TX which it communicates with as the primary TX. After procedure 812, the method proceeds back to procedure 804. Since a new TX was selected as the primary TX, an optimal communication channel needs to be determined between the RX and the new primary TX. As shown in FIG. 7E, procedures 810 and 812 can be executed simultaneously or consecutively, in either order. Therefore, based on the tracking of the communication channel, a given RX may change the permanent communication channel it receives over (procedure 810), the primary TX it communicates with (procedure 812), or both (procedures 810 and 812). It is noted that both of procedures 810 and 812 are optional procedures. In procedure 812, the selection of a new primary TX is executed dynamically, as an RX according to the disclosed technique adapts its communication channel based on the tracking of the communication channel. In each of procedures 810 and 812, the revision may occur at pre-determined time intervals. For example, an RX may revise its determined optimal communication channel and selected primary TX every minute, every five minutes, every ten seconds and the like. The revision may also occur at pre-determined events or factors determined by the RX on the physical line of the network. For example, an RX may revise its determined optimal communication channel and selected primary TX if the quality of signals received drops below a pre-defined threshold, if the number of received signals in a given time period is less than a pre-defined limit and the like. It is noted that the revision occurring in procedures 810 and 812 may occur in an RX via a background process. In the method of FIG. 7E, the need for switching and coordinating between communication channels is eliminated. In addition, such an embodiment can be simply implemented in standard MAC frame signals and exhibits substantially no overhead regarding time in two-node networks and in networks dominated by one-to-many traffic scenarios. Furthermore, since each RX decides on a particular communication channel with a given TX, the signal transmission performance between the given TX and RX can be tuned to favor different signal traffic loads.

Figure 8A:
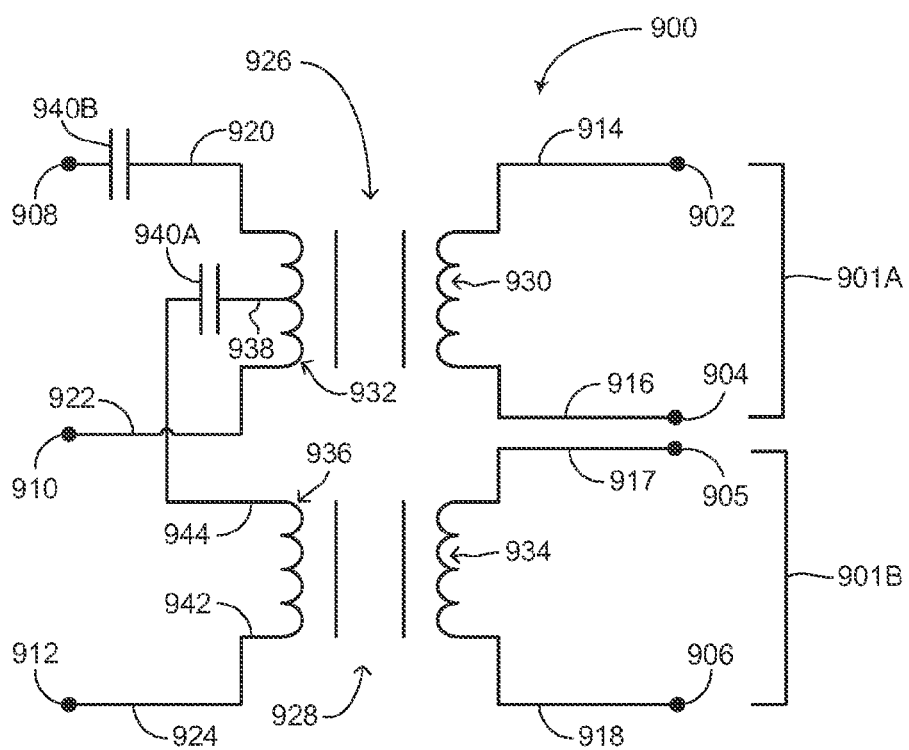
FIG. 8A is a schematic illustration of a balanced coupling circuit for inductively coupling a PLC modem to a power line network, constructed and operative in accordance with another embodiment of the disclosed technique.

As mentioned above, FIGS. 6A-6F represent various types of embodiments that can be used for the TXs and RXs shown in FIGS. 4A-4F. Reference is now made to FIGS. 8A-8D which show additional embodiments of a PLC modem which can be used as the TXs and RXs shown in FIGS. 4A-4F. Reference is now made to FIG. 8A, which is a schematic illustration of a balanced coupling circuit, generally referenced 900, for inductively coupling a PLC modem to a power line network, constructed and operative in accordance with another embodiment of the disclosed technique. The balanced coupling circuit enables a network phase-neutral (herein abbreviated PN) interface to be balanced. Balanced coupling circuit 900 includes a first differential modem port 901A, a second differential modem port 901B, a first network port 908, a second network port 910, a third network port 912, a first transformer line 914, a second transformer line 916, a third transformer line 917, a fourth transformer line 918, a first network line 920, a second network line 922, a third network line 924, a first transformer 926, a second transformer 928, a center tap 938, a center tap capacitor 940A and a first network line capacitor 940B. First differential modem port 901A includes a first terminal 902 and a second terminal 904. Second differential modem port 901B includes a third terminal 905 and a fourth terminal 906. It is noted that first differential modem port 901A and second differential modem port 901B are not coupled with one another. First transformer line 914 and second transformer line 916 extend from first terminal 902 and second terminal 904 respectively to the terminals (not referenced) of a modem side winding 930 of first transformer 926. Third transformer line 917 and fourth transformer line 918 extend from third terminal 905 and fourth terminal 906 respectively to the terminals (not referenced) of a modem side winding 934 of second transformer 928. First network line 920 and second network line 922 extend from first network port 908 and second network port 910 respectively to the terminals (not referenced) of a network side winding 932 of first transformer 926. Third network line 924 extends from third network port 912 to a first terminal 942 of a network side winding 936 of second transformer 928. Center tap 938 extends from the midpoint (not referenced) of network side winding 932 of first transformer 926 to a second terminal 944 of network side winding 936 of second transformer 928. Center tap capacitor 940A is coupled in between center tap 938 of network side winding 932 and second terminal 944 of network side winding 936. First network line capacitor 940B is coupled in between a first terminal (not referenced) of network side winding 932 of first transformer 926 and first network port 908. Center tap capacitor 940A and first network line capacitor 940B are installed for meeting safety regulations.

First terminal 902 and second terminal 904 form a pair of terminals in first differential modem port 901A. First transformer line 914 and first terminal 902 can represent, for example, a modem side phase line, if first network line 920 is a phase line. Second transformer line 916 and second terminal 904 can represent, for example, a modem side neutral line, if second network line 922 is a neutral line. Third terminal 905 and fourth terminal 906 form a pair of terminals in second differential modem port 901B. Fourth transformer line 918 and fourth terminal 906 can represent, for example, a modem side ground line, if third network line 924 is a ground line. Third transformer line 917 and third terminal 905 can represent, for example, a modem side phase-neutral line, if first network line 920 and second network line 922 are respectively a phase line and a neutral line. First network port 908 is coupled with a PLC network line, such as a PLC network phase line (not shown). Second network port 910 is coupled with a PLC network line, such as a PLC network neutral line (not shown). Third network port 912 is coupled with a PLC network line, such as a PLC network ground line (not shown). First terminal 902 and second terminal 904 together define a first modem communication interface (not referenced), such as a modem PN interface. Third terminal 905 and fourth terminal 906 together define a second modem communication interface (not referenced), such as a modem phase-neutral-ground (herein abbreviated PNG) interface. First network port 908 and second network port 910 together define a first network communication interface (not referenced), such as a network PN interface. Second network port 910 and third network port 912 together define a second network communication interface (not referenced), such as a network neutral-ground (herein abbreviated NG) interface.

According to the disclosed technique, the first network communication interface is balanced as it consists of similar conducting lines, i.e. first network line 920 and second network line 922, having similar impedances along their length and having similar ground impedances. Thus any common mode (herein abbreviated CM) noise signals traveling through first network line 920 and second network line 922, i.e. CM noise signals traveling through the network PN interface, substantially cancel each other on network side winding 932 of first transformer 926. Network side winding 932 of first transformer 926 defines a first phase-neutral-ground (herein abbreviated PNG) communication channel. In particular, network side winding 932 is coupled with, either directly or indirectly, each of first network line 920 (e.g. a phase line), third network line 924 (e.g. a ground line) and second network line 922 (e.g. a neutral line). Network side winding 936 of second transformer 928 defines a second PNG communication channel. In particular, network side winding 936 is coupled with, either directly or indirectly, each of first network line 920, third network line 924 and second network line 922.

Hence, modem side winding 930 of first transformer 926 couples first differential modem port 901A of a PLC modem (not shown) to the first PN communication channel. Modem side winding 934 of second transformer 928 couples second differential modem port 901B of the modem to the second PNG communication channel. A signal received on first and second terminals 902 and 904 is a combination of the signals on the first and second network lines, e.g. the PN lines. In addition, a signal received on third and fourth terminals 905 and 906 is a combination of the signals on first, second and third network lines, e.g. the PNG lines. As a consequence, balanced coupling circuit 900 couples two different combinations of the PN and NG signals to the PLC modem instead of independently coupling the PN signal alone to one port on the PLC modem and the NG signal alone to another port of the PLC modem as is done in the prior art.

Figure 8B:
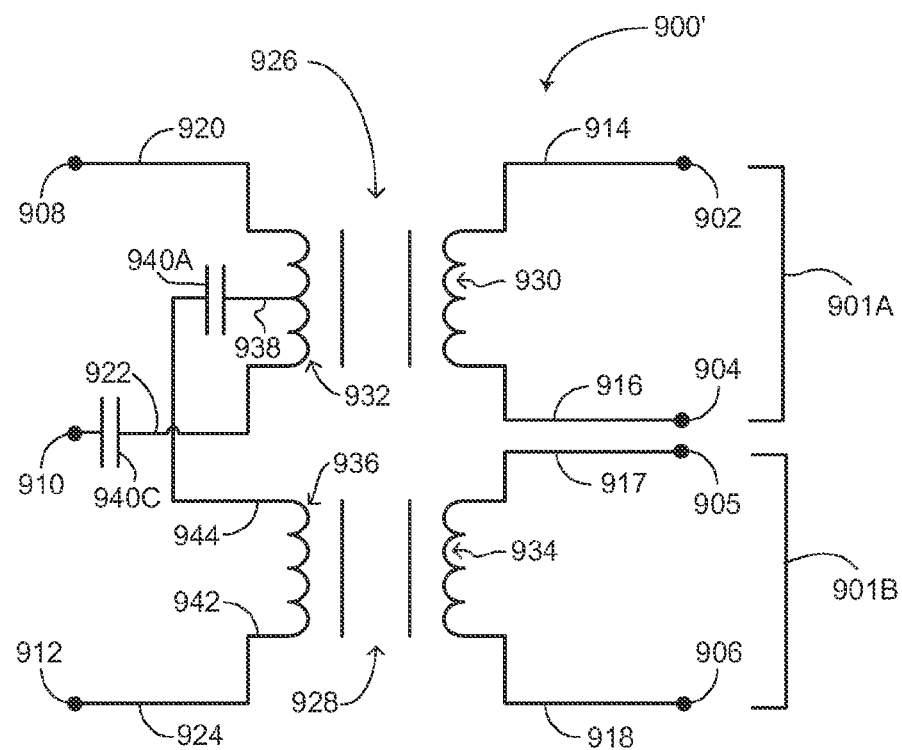
FIG. 8B is a schematic illustration of another balanced coupling circuit for inductively coupling a PLC modem to a power line network, constructed and operative in accordance with a further embodiment of the disclosed technique.

Reference is now made to FIG. 8B, which is a schematic illustration of another balanced coupling circuit, generally referenced 900', for inductively coupling a PLC modem to a power line network, constructed and operative in accordance with a further embodiment of the disclosed technique. Balanced coupling circuit 900' is substantially similar to balanced coupling circuit 900 (FIG. 8A). Equivalent elements in FIGS. 8A and 8B are referenced using identical numbers. Balanced coupling circuit 900' differs from balanced coupling circuit 900 in that a first network line capacitor 940B (FIG. 8A) has been removed from balanced coupling circuit 900'. In addition, balanced coupling circuit 900' includes a second network line capacitor 940C, coupled in between a second terminal (not referenced) of network side winding 932 of first transformer 926 and second network port 910. As in FIG. 8A, second network line capacitor 940C along with a center tap capacitor 940A are installed for meeting safety regulations.

Figure 8C:
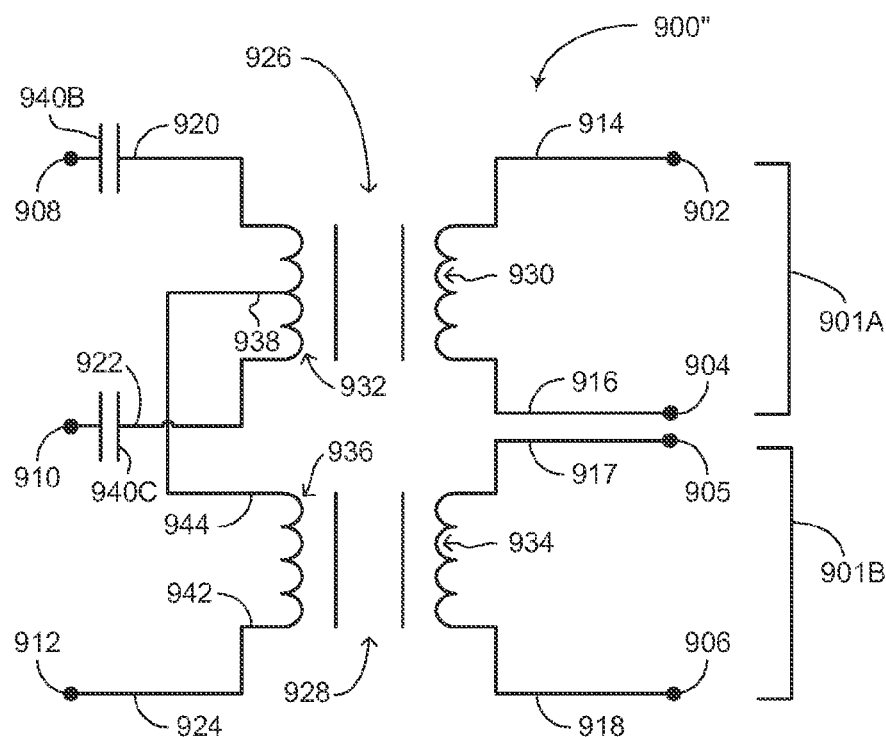
FIG. 8C is a schematic illustration of a further balanced coupling circuit for inductively coupling a PLC modem to a power line network, constructed and operative in accordance with another embodiment of the disclosed technique.

Reference is now made to FIG. 8C, which is a schematic illustration of a further balanced coupling circuit, generally referenced 900", for inductively coupling a PLC modem to a power line network, constructed and operative in accordance with another embodiment of the disclosed technique. Balanced coupling circuit 900" is substantially similar to balanced coupling circuit 900' (FIG. 8B). Equivalent elements in FIGS. 8B and 8C are referenced using identical numbers. Balanced coupling circuit 900" differs from balanced coupling circuit 900' in that both first network line 920 and second network line 922 include respective first network line and second network line capacitors 940B and 940C and that a center tap capacitor 940A has been removed. Therefore in FIG. 8C, a center tap 938 directly couples a network side winding 932 of a first transformer 926 with a second terminal 944 of a network side winding 936 of a second transformer 928. First network line capacitor 940B is coupled between a first network port 908 and a first terminal (not referenced) of network side winding 932 of first transformer 926. Second network line capacitor 940C is coupled between a second network port 910 and a second terminal (not referenced) of network side winding 932 of first transformer 926. As mentioned above, first network line and second network line capacitors 940B and 940C are installed for meeting safety regulations.

Figure 8D:
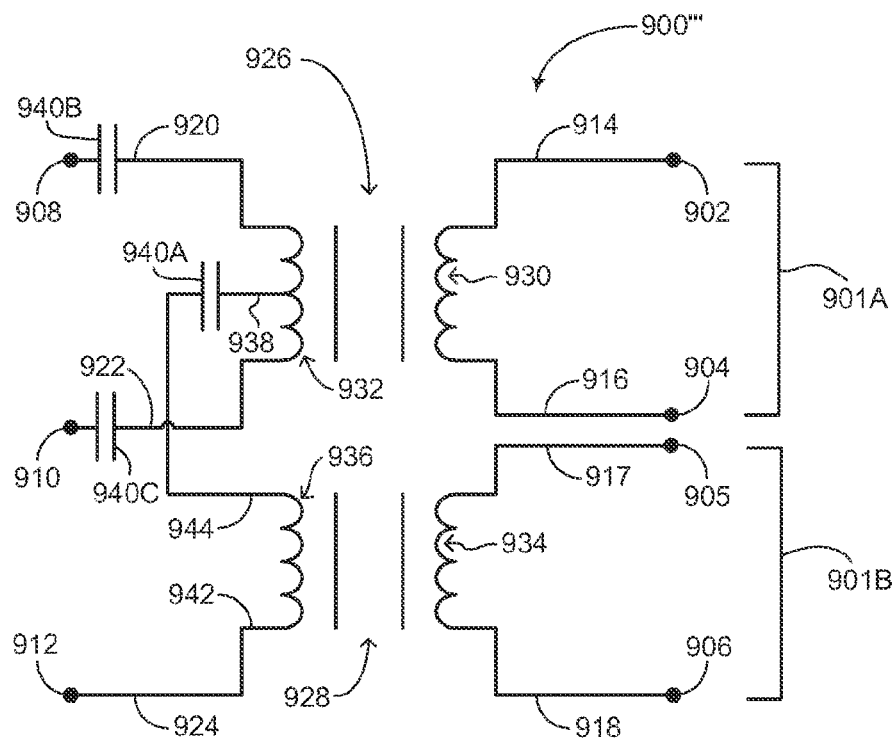
FIG. 8D is a schematic illustration of an additional balanced coupling circuit for inductively coupling a PLC modem to a power line network, constructed and operative in accordance with a further embodiment of the disclosed technique.

Reference is now made to FIG. 8D, which is a schematic illustration of an additional balanced coupling circuit, generally referenced 900''', for inductively coupling a PLC modem to a power line network, constructed and operative in accordance with a further embodiment of the disclosed technique.

Balanced coupling circuit 900''' is substantially similar to balanced coupling circuits 900 (FIG. 8A), 900' (FIG. 8B) and 900" (FIG. 8C). Equivalent elements in FIGS. 8A, 8B and 8C are referenced using identical numbers. Balanced coupling circuit 900''' includes a center tap capacitor 940A, a first network line capacitor 940B and a second network line capacitor 940C, each positioned in balanced coupling circuit 900''' in a manner similar to their respective positions in FIGS. 8A-8C. As mentioned above, center tap capacitor 940A, first network line capacitor 940B and second network line capacitor 940C are installed for meeting safety regulations.

It is noted that each of the embodiments of the balanced coupling circuit of the disclosed technique, as shown above in FIGS. 8A, 8B, 8C and 8D, may be enclosed within a PLC modem (not shown). Therefore, balanced coupling circuits 900, 900', 900" and 900''' may each be embodied as part of a PLC modem. Such a PLC modem would have one side which would couple it to the power line network via first network port 908, second network port 910 and third network port 912. Such a PLC modem could also optionally have another side which would couple it to an electrical device, such as a computer (not shown) or a printer (not shown). As mentioned above, the PLC modems described above including balanced coupling circuits 900, 900', 900" and 900''' could be used in any of the TXs and RXs shown above in FIGS. 4A-4F. As similarly mentioned above in connection with FIGS. 6A-6F, balanced coupling circuits 900, 900', 900" and 900''' could be embodied in the TX of any one of the PLC modems in FIGS. 4A-4F with a prior art RX, balanced coupling circuits 900, 900', 900" and 900''' could be embodied in the RX of any one of the PLC modems in FIGS. 4A-4F with a prior art TX, and balanced coupling circuits 900, 900', 900" and 900''' could be embodied in the TX and the RX of any one of the PLC modems of FIGS. 4A-4F.

Figure 9B:
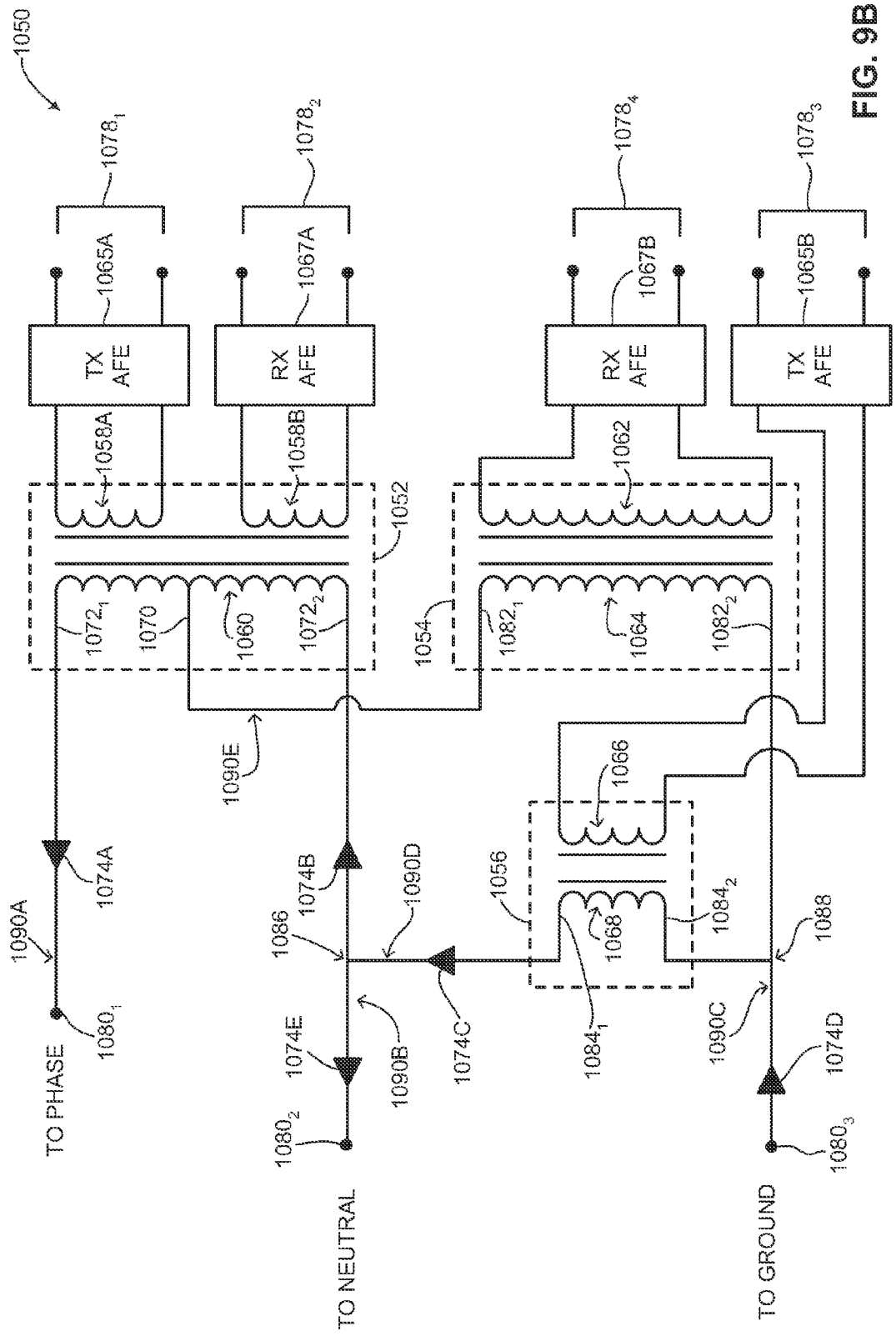
FIG. 9B is a schematic illustration of another balanced coupling circuit for inductively coupling a PLC modem to a power line network including a transmitter section and a receiver section, constructed and operative in accordance with a further embodiment of the disclosed technique.

In addition to the PLC modems of FIGS. 8A-8D, reference is now made to FIGS. 9A and 9B which represent additional embodiments of a PLC modem which can be used as the TXs and RXs shown in FIGS. 4A-4F. Reference is now made FIG. 9A, which is a schematic illustration of a balanced coupling circuit for inductively coupling a PLC modem to a power line network including a transmitter section and a receiver section, generally referenced 1000, constructed and operative in accordance with another embodiment of the disclosed technique. Unlike the examples of balanced coupling circuits 900, 900', 900" and 900''' (respectively FIGS. 8A-8D), where a first differential modem port 901A (FIGS. 8A-8D) and a second differential modem port 901B (FIGS. 8A-8D) are shown for receiving and transmitting signals over a power line network, balanced coupling circuit 1000 shows four differential modem ports for receiving and transmitting signals over a power line network. The interface setup (i.e., the setup of coupling circuit 1000) shown in FIG. 9A is substantially similar to the interface, or coupling circuit setups of FIGS. 8A-8D except that FIG. 9A shows an interface which includes both a receiver and a transmitter for receiving and transmitting over a PLC network. Balanced coupling circuit 1000 includes a first transformer 1002 and a second transformer 1004. First transformer 1002 and second transformer 1004 inductively couple a PLC device (not shown) with a power line network (not labeled).

As shown, first transformer 1002 includes a modem side (not labeled) and a network side (not labeled). The modem side includes a first modem side transmitter (herein abbreviated TX) winding 1006A and a first modem side receiver (herein abbreviated RX) winding 1006B, for coupling first transformer 1002 with the PLC device. The network side includes a first network side winding 1008, for coupling first transformer 1002 with the power line network. First modem side TX winding 1006A is coupled with a transmitter analog front end (herein abbreviated TX AFE) 1014A for transmitting signals over the power line network. First modem side RX winding 1006B is coupled with a receiver analog front end (herein abbreviated RX AFE) 1016A for receiving signals over the power line network. TX AFE 1014A may also be coupled with a line driver (not shown), an amplifier (not shown) and the like. RX AFE 1016A may also be coupled with at least one filter (not shown), such as an analog filter, and the like. TX AFE 1014A is coupled with a first differential modem port $1028_1$. RX AFE 1016A is coupled with a second differential modem port $1028_2$. Both of first modem side TX winding 1006A and first modem side RX winding 1006B are symmetrically coupled with first network side winding 1008. It is noted that in another embodiment of the disclosed technique, the modem side of first transformer 1002 includes only one winding (not shown). In such an embodiment, TX AFE 1014A and RX AFE 1016A are both coupled with the one winding for both transmitting and receiving signals over a PLC network. First differential modem port $1028_1$ and second differential modem port $1028_2$ are coupled with the PLC device. First differential modem port $1028_1$ enables signals to be transmitted from the PLC device over a PN interface (as explained below) of the power line network. Second differential modem port $1028_2$ enables signals to be received by the PLC device from the power line network over the PN interface of the power line network.

First network side winding 1008 includes a first terminal $1020_1$ and a second terminal $1020_2$. First terminal $1020_1$ couples first network side winding 1008 with a phase line of the power line network, shown as a phase terminal $1030_1$. Second terminal $1020_2$ couples first network side winding 1008 with a neutral line of the power line network, shown as a neutral terminal $1030_2$. In this respect, first network side winding 1008 couples first transformer 1002 to phase terminal $1030_1$ and neutral terminal $1030_2$ thus forming a phase-neutral (herein abbreviated PN) interface over which signals can be transmitted and received.

Second transformer 1004 includes a modem side (not labeled) and a network side (not labeled). The modem side includes a second modem side TX winding 1010A and a second modem side RX winding 1010B, for coupling second transformer 1004 with the PLC device. The network side includes a second network side winding 1012, for coupling second transformer 1004 with the power line network. Second modem side TX winding 1010A is coupled with a TX AFE 1014B for transmitting signals over the power line network. Second modem side RX winding 1010B is coupled with an RX AFE 1016B for receiving signals over the power line network. TX AFE 1014B may also be coupled with a line driver (not shown), an amplifier (not shown) and the like. RX AFE 1016B may also be coupled with at least one filter (not shown), such as an analog filter, and the like. TX AFE 1014B is coupled with a third differential modem port $1028_3$. RX AFE 1016B is coupled with a fourth differential modem port $1028_4$. Both of second modem side TX winding 1010A and second modem side RX winding 1010B are symmetrically coupled with second network side winding 1012. It is noted that in another embodiment of the disclosed technique, the modem side of second transformer 1004 includes only one winding (not shown). In such an embodiment, TX AFE 1014B and RX AFE 1016B are both coupled with the one winding for both transmitting and receiving signals over a PLC network. Third differential modem port $1028_3$ and fourth differential modem port $1028_4$ are coupled with the PLC device. Third differential modem port $1028_3$ enables signals to be transmitted from the PLC device over a PNG interface (as explained below) of the power line network. Fourth differential modem port $1028_4$ enables signals to be received by the PLC device from the power line network over the PNG interface of the power line network.

Second network side winding 1012 includes a first terminal $1018_1$ and a second terminal $1018_2$. First terminal $1018_1$ couples second network side winding 1012 with a midpoint 1022 of first network side winding 1008, as explained above in FIGS. 8A-8D. First terminal $1018_1$ couples second transformer 1004 with first transformer 1002 such that first terminal $1018_1$ is substantially coupled with a center tap (not labeled) of first transformer 1002. Second terminal $1018_2$ couples second network side winding 1012 with a ground line of the power line network, shown as a ground terminal $1030_3$. In this respect, second network side winding 1012 couples second transformer 1004 to ground terminal $1030_3$ and a midpoint between first terminal $1020_1$ and second terminal $1020_2$ of first transformer 1002, thus forming a phase-neutral-ground (herein abbreviated PNG) interface over which signals can be transmitted and received. It is noted that coupling circuit 1000 includes at least two capacitors (not shown) on the network side of first transformer 1002 and second transformer 1004. The possible positions of these at least two capacitors in FIG. 9A are substantially equivalent to the various capacitor positions shown above in FIGS. 8A-8D. It is noted that other electrically equivalent positions of the at least two capacitors, besides those shown in FIGS. 8A-8D are possible and are within the knowledge of the worker skilled in the art. It is also noted that phase terminal $1030_1$, neutral terminal $1030_2$ and ground terminal $1030_3$ can be respectively referred to as a phase network port, a neutral network port and a ground network port.

The coupling circuit of the disclosed technique shown in FIG. 9A is used for the simultaneous transmission of signals through two transmit ports (first differential modem port $1028_1$ and third differential modem port $1028_3$) and for the simultaneous reception of signals through two receive ports (second differential modem port $1028_2$ and fourth differential modem port $1028_4$). Each transmit and receive port forms a transmit and receive interface. These two transmit and receive interfaces use three network ports. A first receive and transmit interface (first differential modem port $1028_1$ and second differential modem port $1028_2$) uses two network ports, for example the phase port (shown as phase terminal $1030_1$) and the neutral port (shown as neutral terminal $1030_2$). In coupling circuit 1000, the second transmit and receive interface (third differential modem port $1028_3$ and fourth differential modem port $1028_4$) requires the use of a third network port, such as the ground port (shown as ground terminal $1030_3$), since signals can not be transmitted and received simultaneously over two transmit ports having just two network ports for transmission. Thus a third network port is required. This second receive and transmit interface is coupled with coupling circuit 1000 such that the symmetry between the two network ports of the first receive and transmit interface with respect to the third network port is maintained. Current being received over the ground wire (not labeled) is split, by the center tap coupling second transformer 1004 with first transformer 1002, to currents over phase terminal $1030_1$ and neutral terminal $1030_2$ which are substantially equal in magnitude and in polarity, such that no current is induced on first modem side RX winding 1006B. The polarity is substantially equal in that current on the phase line (not labeled) and neutral line (not labeled) is either flowing away from first transformer 1002 or flowing into first transformer 1002. Such a current flow over the phase and neutral terminals results is substantially no current being induced on first modem side RX winding 1006B. When signals are received by RX AFE 1016B over the PNG interface, current from second network side winding 1012 may travel in the direction of an arrow 1024B over neutral terminal $1030_2$ and in the direction of an arrow 1024D over ground terminal $1030_3$. The topology of coupling circuit 1000 is such that signals received over the PNG interface travel from neutral terminal $1030_2$ to RX AFE 10168 via the center tap (not labeled) of first transformer 1002 which is coupled with midpoint 1022 to second network side winding 1012. This topology enables the PNG interface to prevent current from being induced on first modem side RX winding 1006B.

The coupling circuit shown in FIG. 9A is balanced with regards to the PN interface but not with regards to the PNG interface. Thus signals transmitted over the PLC network in the interface setup of FIG. 9A may suffer from excess levels of radiation. Signals transmitted over the PN interface via first network side winding 1008 exhibit minimal levels of excess radiation and thus this interface is balanced. Excess radiation is any radiation emitted from the phase, neutral or ground lines above a predefined limit which may radiate off, or leak out of those power lines and interfere with signals and devices in the vicinity of those power lines. However, signals transmitted over the PNG interface via second network side winding 1012 may exhibit higher levels of excess radiation which may cause interference and noise on signals and devices in the vicinity of coupling circuit 1000. This is because signals transmitted by TX AFE 1014B travel in the direction of an arrow 1024C towards neutral terminal $1030_2$, with the current of the transmitted signal being split by the center tap such that a portion travels via neutral terminal $1030_2$ and another portion travels via phase terminal $1030_1$. Signals transmitted by TX AFE 1014B via the PNG interface are not balanced since the magnitude of the current over neutral terminal $1030_2$ and ground terminal $1030_3$ is not substantially equivalent and the magnitude of the current over phase terminal $1030_1$ is not substantially zero. When transmitting signals via the PNG interface of FIG. 9A, current leaks out of phase terminal $1030_1$ and may radiate in the air surrounding first transformer 1002, thus potentially corrupting devices in the vicinity. This is due to the topology of coupling circuit 1000. In general, excess radiation over pairs of wires can be minimized by balancing the magnitude of the current on each wire in a pair and minimizing the magnitude of the current on the third wire which is not part of the wire pair. In the interface setup of FIG. 9A, the topology of TX AFE 1014A is such that the current provided to first network side winding 1008 is substantially balanced between phase terminal $1030_1$ and neutral terminal $1030_2$. Therefore signal transmissions over the PN interface are balanced and do not exhibit excess radiation over the phase and neutral lines. However, the topology of TX AFE 1014B is such that the current provided to second network side winding 1012 is unbalanced between neutral terminal $1030_2$ and ground terminal $1030_3$. The current induced in neutral terminal $1030_2$ is not at the same magnitude as the current induced in ground terminal $1030_3$ and the magnitude of the current induced in phase terminal $1030_1$ is not substantially zero. Therefore signal transmissions over the PNG interface are not balanced and thereby exhibit excess radiation over the phase, neutral and ground lines. According to the disclosed technique, the unbalanced current between the phase, neutral and ground lines can be balanced such that the symmetric characteristics of the receiving circuits of coupling circuit 1000 are maintained. A coupling circuit, or interface setup, having both a balanced PN interface and a balanced NG interface is shown below in FIG. 9B which maintains the symmetric characteristics of the receiving circuits of FIG. 9A.

It is noted that FIG. 9A shows three network side terminals, a phase terminal $1030_1$, a neutral terminal $1030_2$ and a ground terminal $1030_3$. According to the disclosed technique, the three network side terminals shown in FIG. 9A are not limiting and are brought merely as an example. According to the disclosed technique, each of the terminals labeled $1030_1$, $1030_2$ and $1030_3$ may be coupled to respectively one of a phase line, a neutral line and a ground line. For example, terminal $1030_1$ may be a neutral terminal (not shown), terminal $1030_2$ may be a phase terminal (not shown) and terminal $1030_3$ may be a ground terminal (as shown). Terminal $1030_1$ may be a phase terminal (as shown), terminal $1030_2$ may be a ground terminal (not shown) and terminal $1030_3$ may be a neutral terminal (not shown). Terminal $1030_1$ may be a ground terminal (not shown), terminal $1030_2$ may be a neutral terminal (as shown) and terminal $1030_3$ may be a phase terminal (not shown). Terminal $1030_1$ may be a ground terminal (not shown), terminal $1030_2$ may be a phase terminal (not shown) and terminal $1030_3$ may be a neutral terminal (not shown). Terminal $1030_1$ may be a neutral terminal (not shown), terminal $1030_2$ may be a ground terminal (not shown) and terminal $1030_3$ may be a phase terminal (not shown).

Reference is now made to FIG. 9B, which is a schematic illustration of another balanced coupling circuit for inductively coupling a PLC modem to a power line network including a transmitter section and a receiver section, generally referenced 1050, constructed and operative in accordance with a further embodiment of the disclosed technique. Like FIG. 9A, FIG. 9B shows a balanced coupling circuit with four differential modem ports for receiving and transmitting signals over a power line network. Balanced coupling circuit 1050 includes a first transformer 1052, a second transformer 1054 and a third transformer 1056. First transformer 1052, second transformer 1054 and third transformer 1056 inductively couple a PLC device (not shown) with a power line network (not labeled).

As shown, first transformer 1052 includes a modem side (not labeled) and a network side (not labeled). The modem side includes a first modem side TX winding 1058A and a first modem side RX winding 1058B, for coupling first transformer 1052 with the PLC device. The network side includes a first network side winding 1060, for coupling first transformer 1052 with the power line network. First modem side TX winding 1058A is coupled with a TX AFE 1065A for transmitting signals over the power line network. First modem side RX winding 1058B is coupled with an RX AFE 1067A for receiving signals over the power line network. TX AFE 1065A may also be coupled with a line driver (not shown), an amplifier (not shown) and the like. RX AFE 1067A may also be coupled with at least one filter (not shown), such as an analog filter, and the like. TX AFE 1065A is coupled with a first differential modem port $1078_1$. RX AFE 1067A is coupled with a second differential modem port $1078_2$. Both of first modem side TX winding 1058A and first modem side RX winding 1058B are symmetrically coupled with first network side winding 1060. It is noted that in another embodiment of the disclosed technique, the modem side of first transformer 1052 includes only one winding (not shown). In such an embodiment, TX AFE 1065A and RX AFE 1067A are both coupled with the one winding for both transmitting and receiving signals over a PLC network. First differential modem port $1078_1$ and second differential modem port $1078_2$ are coupled with the PLC device. First differential modem port $1078_1$ enables signals to be transmitted from the PLC device over a PN interface of the power line network, i.e. over a wire pair channel including a phase wire and a neutral wire. Second differential modem port $1078_2$ enables signals to be received by the PLC device from the power line network over the PN interface of the power line network.

First network side winding 1060 includes a first terminal $1072_1$ and a second terminal $1072_2$. First terminal $1072_1$ couples first network side winding 1060 with a phase line of the power line network, shown as a phase terminal $1080_1$. Second terminal $1072_2$ couples first network side winding 1060 with a neutral line of the power line network, shown as a neutral terminal $1080_2$. In this respect, first network side winding 1060 couples first transformer 1052 to phase terminal $1080_1$ and neutral terminal $1080_2$ thus forming a PN interface over which signals can be transmitted and received.

Second transformer 1054 includes a modem side (not labeled) and a network side (not labeled). The modem side includes a second modem side RX winding 1062, for coupling second transformer 1054 with the PLC device. Unlike second transformer 1004 (FIG. 9A), second transformer 1054 does not include a second mode side TX winding. The network side includes a second network side winding 1064, for coupling second transformer 1054 with the power line network. Second modem side RX winding 1062 is coupled with an RX AFE 1067B for receiving signals over the power line network. As described below, a TX AFE 1065B is coupled with third transformer 1056. TX AFE 1065B may also be coupled with a line driver (not shown), an amplifier (not shown) and the like. RX AFE 1067B may also be coupled with at least one filter (not shown), such as an analog filter, and the like. TX AFE 1065B is coupled with a third differential modem port $1078_3$. RX AFE 1067B is coupled with a fourth differential modem port $1078_4$. Third differential modem port $1078_3$ and fourth differential modem port $1078_4$ are coupled with the PLC device. Third differential modem port $1078_3$ enables signals to be transmitted from the PLC device over an NG interface (as explained below) of the power line network. Fourth differential modem port $1078_4$ enables signals to be received by the PLC device from the power line network over the NG interface of the power line network.

Second network side winding 1064 includes a first terminal $1082_1$ and a second terminal $1082_2$. First terminal $1082_1$ couples second network side winding 1064 with a midpoint 1070 of first network side winding 1060, as explained above in FIGS. 8A-8D and FIG. 9A. First terminal $1082_1$ couples second transformer 1054 with first transformer 1052 such that first terminal $1082_1$ is substantially coupled with a center tap (not labeled) of first transformer 1052. Second terminal $1082_2$ couples second network side winding 1064 with a ground line of the power line network, shown as a ground terminal $1080_3$. In this respect, second network side winding 1064 couples second transformer 1054 to ground terminal $1080_3$ and a midpoint between first terminal $1072_1$ and second terminal $1072_2$ of first transformer 1052, thus forming a PNG interface over which signals can be received.

Third transformer 1056 includes a modem side (not labeled) and a network side (not labeled). The modem side includes a second modem side TX winding 1066, for coupling third transformer 1056 with the PLC device. The network side includes a third network side winding 1068, for coupling third transformer 1056 with the power line network. Second modem side TX winding 1066 is coupled with TX AFE 1065B. Third network side winding 1068 includes a first terminal $1084_1$ and a second terminal $1084_2$. First terminal $1084_1$ couples third network side winding 1068 with the neutral wire at a point 1086. Second terminal $1084_2$ couples third network side winding 1068 with a ground wire at a point 1088. Third transformer 1056 thus couples TX AFE 1065B with neutral terminal $1080_2$ and ground terminal $1080_3$ thus forming an NG interface for transmitting signals over the power line network.

As shown, when signals are transmitted over the PN interface by TX AFE 1065A, current is induced over phase terminal $1080_1$ in the direction of an arrow 1074A and over network terminal $1080_2$ in the direction of an arrow 1074B. Substantially no current is induced over ground terminal $1080_3$. Thus the PN interface of coupling circuit 1050 is balanced. When signals are transmitted over the NG interface by TX AFE 1065B, current is induced over network terminal $1080_2$ in the direction of arrows 1074C and 1074E and over ground terminal $1080_3$ in the direction of an arrow 1074D. No current is induced over phase terminal $1080_1$. Thus the NG interface of coupling circuit 1050 is also balanced with regards to transmitting signals over the PLC network. As shown, the coupling of the network sides of first transformer 1052 and second transformer 1054 are equivalent to the coupling of the network sides in coupling circuit 1000 (FIG. 9A) such that the behavior of RX AFE 1067A and RX AFE 1067B is equivalent to that of RX AFE 1016A (FIG. 9A) and RX AFE 1016B (FIG. 9A). In coupling circuit 1050, signals are transmitted over a PN interface and an NG interface whereas signals are received over the PN interface and a PNG interface. Thus the setup of coupling circuit 1050 maintains balanced PN and NG interfaces for transmitting signals as well. In the setup of FIG. 9B, signals which are transmitted via TX AFE 1065B bypass second transformer 1054 and the center tap of first transformer 1052. Signals which are transmitted via TX AFE 1065B are transmitted directly over the neutral wire and the ground wire, thus over an NG interface. As shown, the topology of third transformer 1056 enables any current representing a transmission on neutral terminal $1080_2$ and ground terminal $1080_3$ to be balanced. At the same time, the current of signals transmitted via TX AFE 1065A remains balanced over phase terminal $1080_1$ and neutral terminal $1080_2$. In addition, signals received from the power line network to RX AFE 1067A via the PN interface and to RX AFE 1067B via the PNG interface maintain their symmetric characteristics as explained above in FIG. 9A. The coupling circuit of FIG. 9B thus enables a PLC device to be coupled with a power line network wherein the PN and NG interfaces for transmission are balanced in terms of the magnitude of the current induced over each wire in the phase-neutral wire pair and the neutral-ground wire pair. The balanced current thus enables signals to be transmitted over the PN and NG interfaces with minimal excess of radiation leaking out of the phase, neutral and ground wires which could potentially interfere with other devices in the vicinity.

It is noted that coupling circuit 1050 includes at least two capacitors, similar to the capacitors mentioned above in FIG. 9A and shown above in FIGS. 8A-8D. The various possibilities of the positioning of the at least two capacitors in coupling circuit 1050 are shown in FIG. 9B via a plurality of arrows 1090A-1090E, wherein each arrow demarcates a particular location in coupling circuit 1050 where a capacitor can be placed. Arrow 1090A represents a position on the phase line between first terminal $1072_1$ and phase terminal $1080_1$. Arrow 1090B represents a position on the neutral line between second terminal $1072_2$ and neutral terminal $1080_2$ after the coupling of third transformer 1056 to the neutral line, i.e. between point 1086 where third transformer 1056 is coupled with the neutral line and neutral terminal $1080_2$.

Arrow 1090C represents a position on the ground line between ground terminal $1080_3$ and after the coupling of third transformer 1056 to the ground line, i.e. between point 1088 where third transformer 1056 is coupled with the ground line and ground terminal $1080_3$. Arrow 1090D represents a position on a line (not labeled) between first terminal $1084_1$ and a coupling of third transformer 1056 to the neutral line. Arrow 1090E represents a position on a line (not labeled) between first terminal $1082_1$ and the center tap of first network side winding 1060. In a preferred embodiment of the disclosed technique, two capacitors are positioned, a first where arrow 1090A indicates and a second where arrow 1090B indicates. In another embodiment of the disclosed technique, two capacitors are positioned, a first where arrow 1090B indicates and a second where arrow 1090C indicates. In a further embodiment of the disclosed technique, three capacitors are positioned, a first where arrow 1090A indicates, a second where arrow 1090D indicates and a third where arrow 1090E indicates. In another embodiment of the disclosed technique, three capacitors are positioned, a first where arrow 1090B indicates, a second where arrow 1090D indicates and a third where arrow 1090E indicates. In a further embodiment of the disclosed technique, three capacitors are positioned, a first where arrow 1090A indicates, a second where arrow 1090B indicates and a third where arrow 1090E indicates. It is noted that other electrically equivalent possibilities exist for the positioning of the at least two capacitors in coupling circuit 1050 and are within the knowledge of the worker skilled in the art.

It is noted that FIG. 9B shows three network side terminals, a phase terminal $1080_1$, a neutral terminal $1080_2$ and a ground terminal $1080_3$. According to the disclosed technique, the three network side terminals shown in FIG. 9B are not limiting and are brought merely as an example. According to the disclosed technique, each of the terminals labeled $1080_1$, $1080_2$ and $1080_3$ may be coupled to respectively one of a phase line, a neutral line and a ground line. For example, terminal $1080_1$ may be a neutral terminal (not shown), terminal $1080_2$ may be a phase terminal (not shown) and terminal $1080_3$ may be a ground terminal (as shown). Terminal $1080_1$ may be a phase terminal (as shown), terminal $1080_2$ may be a ground terminal (not shown) and terminal $1080_3$ may be a neutral terminal (not shown). Terminal $1080_1$ may be a ground terminal (not shown), terminal $1080_2$ may be a neutral terminal (as shown) and terminal $1080_3$ may be a phase terminal (not shown). Terminal $1080_1$ may be a ground terminal (not shown), terminal $1080_2$ may be a phase terminal (not shown) and terminal $1080_3$ may be a neutral terminal (not shown). Terminal $1080_1$ may be a neutral terminal (not shown), terminal $1080_2$ may be a ground terminal (not shown) and terminal $1080_3$ may be a phase terminal (not shown).

It is noted that each of the embodiments of the balanced coupling circuit of the disclosed technique, as shown above in FIGS. 9A and 9B may be enclosed within a PLC modem (not shown). Therefore, balanced coupling circuits 1000 and 1050 may each be embodied as part of a PLC modem. Such a PLC modem would have one side which would couple it to the power line network via phase terminal $1030_1$, a neutral terminal $1030_2$ and a ground terminal $1030_3$. Such a PLC modem would also optionally have another side which would couple it to an electrical device, such as a computer (not shown) or a printer (not shown). As mentioned above, the PLC modems described above including balanced coupling circuits 1000 and 1050 could be used in any of the TXs and RXs shown above in FIGS. 4A-4F.

It will be appreciated by persons skilled in the art that the disclosed technique is not limited to what has been particularly shown and described hereinabove. Rather the scope of the disclosed technique is defined only by the claims, which follow.

The invention claimed is:

1. System, for transmitting and receiving signals over residential electrical cables comprising at least one active wire, one neutral wire and one ground wire, said system comprising:
   at least two power line modems, each one of said at least two power line modems coupling a respective electrical device with a respective electrical socket, each said respective electrical socket being coupled with said residential electrical cables,
   each one of said at least two power line modems comprising:
      a processor;
      a plurality of transmitters, coupled with said processor, for transmitting said signals; and
      at least one receiver, coupled with said processor, for receiving said signals,
      wherein said processor determines a frequency carrier wave for said signals when said signals are transmitted;
   wherein at least one of said plurality of transmitters and said at least one receiver comprising a coupling circuit for coupling said one of said at least two power line modems to said residential electrical cables, said coupling circuit comprising:
      a first transformer, comprising:
         a first network side winding;
         a first modem side winding; and
         a center tap,
            each of said first network side winding and said first modem side winding respectively comprising two terminals, a first terminal of said first network side winding being coupled with said at least one active wire and a second terminal of said first network side winding being coupled with said at least one neutral wire, said center tap extending from a midpoint between said two terminals of said first network side winding;
      a second transformer, comprising:
         a second network side winding; and
         a second modem side winding,
            each of said second network side winding and said second modem side winding respectively comprising two terminals, a first terminal of said second network side winding being coupled with said center tap and a second terminal of said second network side winding being coupled with said at least one ground wire;
      wherein at least one receive wire pair is formed from at least two of said at least one active wire, said at least one neutral wire, said at least one ground wire and said midpoint;
      wherein at least one transmit wire pair is formed from at least two of said at least one active wire, said at least one neutral wire, said at least one ground wire and said midpoint;
      wherein said processor enables said at least one receiver to be coupled with said at least one receive wire pair and said plurality of transmitters to be coupled with said at least one transmit wire pair;
      wherein each one of said plurality of transmitters defines a respective carrier wave set over said at least one transmit wire pair, and
      wherein said processor provides said signals to a respective one of said plurality of transmitters according to said respective carrier wave set said frequency carrier wave of said signals is in.

2. The system according to claim 1, said coupling circuit further comprising:
   a first network port, for coupling said at least one active wire with said first terminal of said first network side winding;
   a second network port, for coupling said at least one neutral wire with said second terminal of said first network side winding;
   a third network port, for coupling said at least one ground wire with said second terminal of said second network side winding;
   a first differential modem port, comprising a first terminal and a second terminal;
   a second differential modem port, comprising a third terminal and a fourth terminal; and
   at least two capacitors,
   wherein said first terminal and said second terminal of said first differential modem port of said first transformer being respectively coupled with said two terminals of said first modem side winding;
   wherein said third terminal and said fourth terminal of said second differential modem port being respectively coupled with said two terminals of said second modem side winding; and
   wherein said at least two capacitors are coupled between at least any two of:
   said midpoint of said first network side winding and said second terminal of said second network side winding;
   a first one of said two terminals of said first network side winding and said first network port; and
   a second one of said two terminals of said first network side winding and said second network port.

3. The system according to claim 1, said coupling circuit further comprising:
   a first network port, for coupling said at least one active wire with said first terminal of said first network side winding;
   a second network port, for coupling said at least one neutral wire with said second terminal of said first network side winding;
   a third network port, for coupling said at least one ground wire with said second terminal of said second network side winding;
   a first differential modem port;
   a second differential modem port;
   a third differential modem port;
   a fourth differential modem port;
   a third transformer; and
   at least two capacitors,
   said first modem side winding of said first transformer comprising:
      a first modem side transmitter (TX) winding, said first modem side TX winding comprising two terminals; and
      a first modem side receiver (RX) winding, said first modem side RX winding comprising two terminals,
      said first modem side TX winding coupled with said first differential modem port, said first modem side RX winding coupled with said second differential modem port,
   said second modem side winding of said second transformer comprising a second modem side RX winding, said second modem side RX winding comprising said respective two terminals and coupled with said fourth differential modem port;

said third transformer comprising:
- a third network side winding, said third network side winding comprising two terminals; and
- a second modem side TX winding, said second modem side TX winding comprising two terminals,
- said second modem side TX winding being coupled with said third differential modem port, a first one of said two terminals of said third network side winding being coupled with said at least one neutral wire and a second one of said two terminals of said third network side winding being coupled with said at least one ground wire.

* * * * *